United States Patent
Green et al.

[19]

[11] Patent Number: 6,041,310

[45] Date of Patent: Mar. 21, 2000

[54] METHOD AND SYSTEM FOR AUTOMOBILE TRANSACTIONS

[75] Inventors: H. Dean Green, Greensboro; George J. Salquero, High Point; Lowell Lang, deceased, late of Greensboro, all of N.C., by Marilyn Lang, legal representative

[73] Assignee: Green Ford, Inc.

[21] Appl. No.: 08/764,541

[22] Filed: Dec. 12, 1996

[51] Int. Cl.[7] .................................................. G06F 17/60
[52] U.S. Cl. .............................. 705/27; 705/1; 705/26; 707/104
[58] Field of Search .................... 705/26, 27, 1; 707/104

[56] References Cited

U.S. PATENT DOCUMENTS

| | | | |
|---|---|---|---|
| Re. 35,184 | 3/1996 | Walker | 705/26 |
| 4,775,935 | 10/1988 | Yourick | 395/357 |
| 4,831,526 | 5/1989 | Luchs et al. | 705/4 |
| 4,899,292 | 2/1990 | Montagna et al. | 707/501 |
| 4,992,940 | 2/1991 | Dworkin | 705/26 |
| 5,053,956 | 10/1991 | Donald et al. | 713/601 |
| 5,283,731 | 2/1994 | Lalonde et al. | 705/1 |
| 5,351,186 | 9/1994 | Bullock et al. | 705/1 |
| 5,422,809 | 6/1995 | Griffin et al. | 705/5 |
| 5,440,479 | 8/1995 | Hutton | 705/26 |
| 5,493,490 | 2/1996 | Johnson | 705/26 |

OTHER PUBLICATIONS

CAR MAX system printout.
AutoNation USA system printout.
CAR MAX® system printout, date unknown, but believed to be prior art.
AutoNation USA system printout, date unknown, but believed to be prior art.

*Primary Examiner*—Allen R. MacDonald
*Assistant Examiner*—Jagdish Patel
*Attorney, Agent, or Firm*—Rhodes, Coats & Bennett

[57] ABSTRACT

The invention relates to a method and system for facilitating a transaction between a customer and an automobile dealership. The system includes a kiosk including an input/display terminal and a terminal processor for formulating a multilevel customer query of automobile inventory. The query searches a storage device containing automobile data and images to return a selected inventory to the input/display device. The practice of the invention includes storing customer data, selected inventory information for later access by a marketing follow-up application and a financing and insurance application.

32 Claims, 20 Drawing Sheets

Microfiche Appendix Included
(8 Microfiche, 845 Pages)

FIG. 6

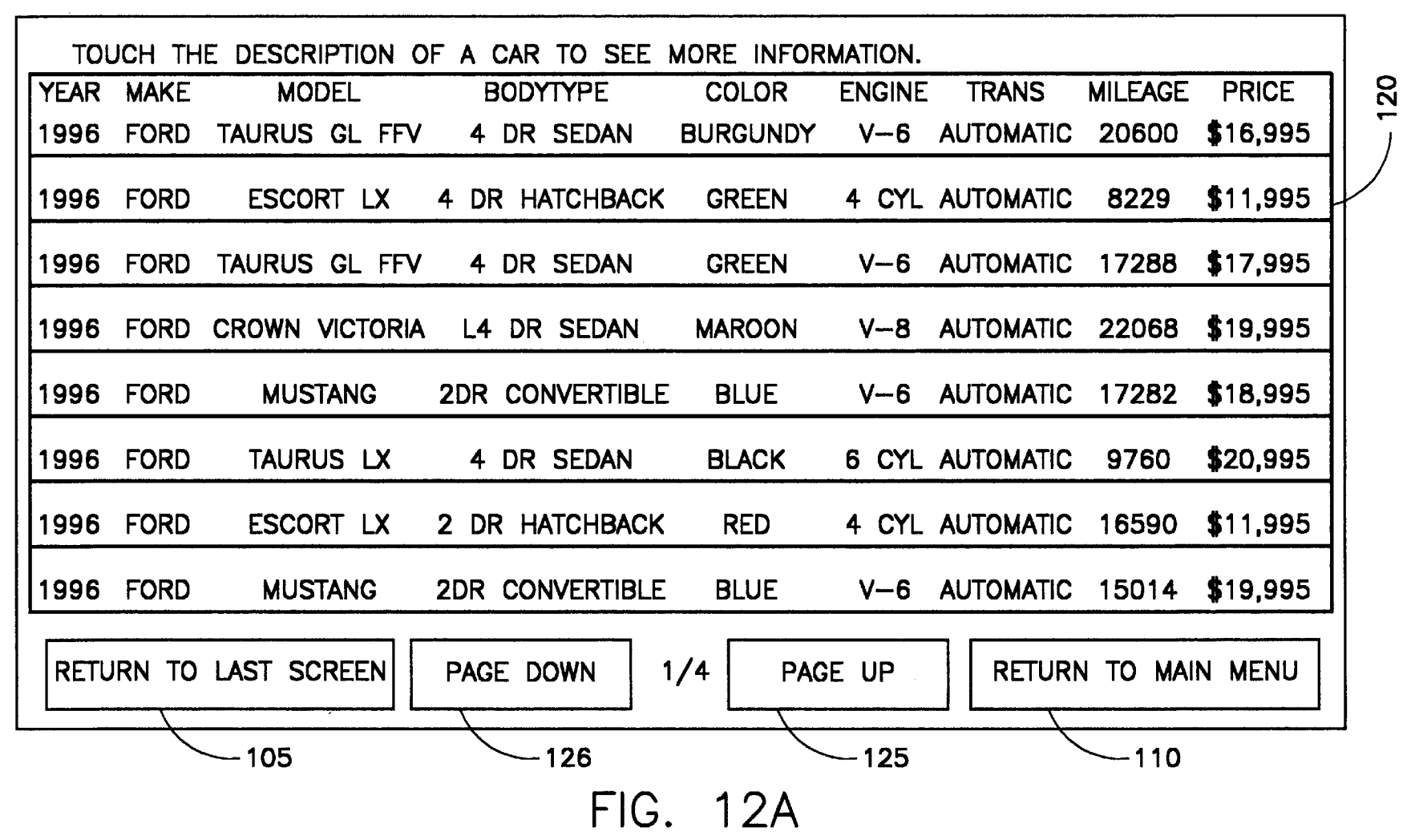

TOUCH THE DESCRIPTION OF A CAR TO SEE MORE INFORMATION.

| YEAR | MAKE | MODEL | BODYTYPE | COLOR | ENGINE | TRANS | MILEAGE | PRICE |
|---|---|---|---|---|---|---|---|---|
| 1996 | FORD | TAURUS GL FFV | 4 DR SEDAN | BURGUNDY | V-6 | AUTOMATIC | 20600 | $16,995 |
| 1996 | FORD | ESCORT LX | 4 DR HATCHBACK | GREEN | 4 CYL | AUTOMATIC | 8229 | $11,995 |
| 1996 | FORD | TAURUS GL FFV | 4 DR SEDAN | GREEN | V-6 | AUTOMATIC | 17288 | $17,995 |
| 1996 | FORD | CROWN VICTORIA | L4 DR SEDAN | MAROON | V-8 | AUTOMATIC | 22068 | $19,995 |
| 1996 | FORD | MUSTANG | 2DR CONVERTIBLE | BLUE | V-6 | AUTOMATIC | 17282 | $18,995 |
| 1996 | FORD | TAURUS LX | 4 DR SEDAN | BLACK | 6 CYL | AUTOMATIC | 9760 | $20,995 |
| 1996 | FORD | ESCORT LX | 2 DR HATCHBACK | RED | 4 CYL | AUTOMATIC | 16590 | $11,995 |
| 1996 | FORD | MUSTANG | 2DR CONVERTIBLE | BLUE | V-6 | AUTOMATIC | 15014 | $19,995 |

RETURN TO LAST SCREEN — 105
PAGE DOWN — 126
1/4
PAGE UP — 125
RETURN TO MAIN MENU — 110
120

FIG. 12A

1996 FORD
STOCK NO: S136
TRANSMISSION: AUTO 2WD
LOCATION: — 160

TAURUS
MILEAGE: 22764
ENGINE: V6 FI

4D SEDAN
COLOR: DARK GREY
VIN: 1FALP52U8TA235112 — 162

- ELECTRONIC F. I.
- 4 SPD AUTO W/O. D. TRANS
- FRONT WHEEL DRV
- PWR RACK PINION STRNG
- POWER BRAKES
- ANTI-LOCK BRAKES
- AIR CONDITIONING
- DUAL FRONT AIR BAGS
- CLOTH SEATING
- BUCKET SEATS
- MULTIADJ DRIVER SEAT
- PWR WINDOWS
- PWR DOOR LOCKS
- PWR OUTER MIRRORS
- TILT STRNG WHL
- CRUISE CONTROL
- TACHOMETER
- REAR WIND DEFOG
- INTERMITTENT WIPERS
- DIGITAL CLOCK
- AM/FM ETR RADIO
- CASSETTE PLAYER
- CONSOLE
- COLOR KEYED BUMPERS
- AERO HALOGEN LTS
- ALLOY WHLS
- REMOTE TRUNK REL

PLEASE ASK YOUR SALES CONSULTANT
FOR A TEST DRIVE — 164

FIG. 13

METHOD AND SYSTEM FOR AUTOMOBILE TRANSACTIONS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

MICROFICHE APPENDIX

This application includes a microfiche appendix (8 pages, 845 frames) containing a computer listing.

BACKGROUND OF THE INVENTION

The present invention relates to a method and a system for facilitating automobile purchase and lease transactions. More specifically, the present invention relates to an interactive system which collects customer requirements and preferences and provides a listing of available dealership inventory matching those items. The system permits a customer to review a number of available vehicles to narrow the scope of his search prior to the involvement of a sales assistant. The system may be used for either new or used vehicles.

The modern automobile customer is faced with a daunting array of choices for not only car models from which to choose but also with respect to the business from which to buy them. The average size of automobile dealerships for both new and used vehicles is growing. Moreover, with increasing frequency, dealerships sell multiple automobile lines under one roof. Therefore, even within a particular price range, automobile type, or manufacturer line, there are a plethora of choices and decisions to be made by the consumer.

In a typical car purchase transaction, the customer visits the dealership and wanders the showroom or the dealer's lot in search of an automobile meeting the customer's requirements and desires. The customer does not have any information concerning current dealership inventory. The customer may be approached by a salesperson who will provide assistance to the customer in locating and identifying the desired make and model. For the reasons described above, this process can be quite time consuming, particularly if the customer is unsure about her needs.

The process for a used car may be even more cumbersome. Used cars of a particular line may be found at many more dealerships than just those of that particular line. It follows that the customer has an even larger number of potential trips to make to examine cars. Shopping for used cars using newspaper advertisements can also be very time intensive and has the potential to produce disappointing results because newspaper advertisements typically provide only bare-bones information and do not provide a visual image of the automobile to give some indication of its condition. U.S. Pat. No. 5,238,731 to Lalonde et al. discloses a Computer-Based Classified Ad System and Method which features visual images of the items offered for sale.

Some customers may prefer to do their initial model selection alone in the absence of any sales pressure from an employee of the dealership. The dealership may benefit from this preference by not having a salesperson tied up with a customer who is unsure of what he wants. The dealership and the customer will benefit from involving the salesperson at a point where the customer knows what he wants.

The systems that have been developed in this area do not address all the needs described above. For example, the Car Max® chain of used car "superstores" provides a customer operated system for car selection called AutoMation® Vehicle Browse. It is believed that the system stores a customer name for display in an on-screen greeting. The system also uses the customer's zip code to incorporate the associated city into the customer greeting. However, it is not believed that the system creates a link to a salesperson or contacts the salesperson when the customer is ready to test drive a vehicle. A similar system is available from the Auto Nation USA used car chain. However, it is believed that that system does have the features described above.

There is a need then for a system and a method of facilitating an automobile transaction which will permit a customer to sift through the myriad choices available for a car purchase. At the same time, the system and method must optimize salesperson effectiveness by involving the salesperson in the transaction only when needed and at the point where the customer is most likely to be ready to purchase. Desirably, such a system would also link the salesperson to the customer to permit follow-up both during the customer's visit and later, after the customer has left the dealership.

SUMMARY OF THE INVENTION

The system of the present invention provides several advantages over prior art methods of handling automobile transactions. First, the system establishes a link between the salesperson and the customer that is maintained throughout the customer transaction. The customer is automatically directed to the salesperson when he needs help navigating the system and when he desires further assistance to examine selected inventory. The system captures basic information about the customer, which information can later be reused for a variety of purposes. The information can be used for follow-up marketing, to gather data on customer demographics, and to expedite the administrative paperwork associated with the car purchase as the transaction is closed. With respect to the last item, the system provides an interface between a financing and insurance application and customer data maintained on a storage device so that the required paperwork for an automobile transaction can be completed quickly and efficiently with reduced opportunity for mistakes. The method and system of the present invention are desirably practiced using touch screen technology for customer input. Touch screens are less intimidating for some customers than keyboards and are believed to be more reliable in the long term than keyboards. The touch screen technology is augmented by audio instructions and confirmation of each customer selection. Thus, the customer is provided with a pleasant, interactive purchase experience that will help to build repeat business.

The data that is collected concerning customer queries may be collected by a dealership and analyzed to track customer preferences and thus guide inventory purchases. For a used car dealer, this aspect is particularly valuable as it allows the dealer to stock vehicles having the highest turnover rate.

Another aspect of this system permits dealership management to monitor salesperson performance in response to customer requests for help and additional information concerning vehicles. This feature can be valuable for maintaining a high level of customer satisfaction.

The present invention includes an on-site system for facilitating an automobile transaction for a customer. The system comprises an input/display terminal adapted to form a multilevel customer query and to display responses thereto. The terminal including a terminal processor which is adapted to create a link between the customer and a salesperson assigned to that customer. This salesperson is referred to as a "linked" salesperson and is tied to that particular customer throughout the transaction.

The system further includes a data server adapted to route a customer query from the input/display terminal to a storage device containing customer data, automobile inventory data, vehicle images, and video files. The storage device is adapted to communicate to the input/display device via the data server a selected inventory responsive to the customer query. The term "selected inventory" has the specific meaning explained herein below.

The system further includes a communications device for making a customer-initiated contact with the linked sales person from the input/display terminal via the data server.

The system could also include a printer for printing information relating to at least one automobile from the selected inventory.

An addition feature of the system is an interface between the storage device and an automobile check-in system wherein the interface updates the inventory data to include data relating to newly acquired automobiles as the newly acquired automobiles are received.

In the practice of the present invention the selected inventory is comprised of a minimum number of vehicles from the current automobile inventory.

The system may further include an interface between the storage device and a financing and insurance application, which application is capable of extracting customer data and selected inventory information to determine exact monthly payments for the lease/purchase of an automobile from the selected inventory.

The present invention also comprehends a method for facilitating an automobile purchase transaction between a customer and an automobile dealership. The method comprises assigning a linked sales person to the customer. The linked salesperson is tied to that customer throughout the remaining steps of the method. The method further includes providing a customer transaction terminal including a display/input terminal and a terminal processor and providing a storage device containing customer data, vehicle data, vehicle images, instructional audio, video, and a payment module. A multilevel customer query is created, the query containing parameters relating to a preferred automobile in the kiosk processor. The method also includes displaying a selected inventory at the input/display device, wherein the selected inventory comprises a minimum number of selected automobiles from the automobile inventory database to include additional automobiles outside customer parameters if fewer than the minimum number of automobiles meeting customer parameters exist in the inventory; contacting the linked salesperson responsive to a customer-initiated request from the input/display device and storing the customer query and selected inventory in the storage device.

Other aspects of the method of the present invention include displaying a list of available salespersons on the input/display device; and contacting a customer-selected sales person from the list via the communications device. Alternatively, the method includes displaying a group of images of available sales persons; and contacting a customer-selected sales person from the group via the communications device.

The method further includes generating a primary multi-level customer query in the input/display terminal processor; displaying a selected inventory if the primary query returns a minimum number of vehicles from the current inventory; generating a secondary query in the input/display terminal processor if the primary query fails to return a minimum number of vehicles; displaying a selected inventory comprised of vehicles meeting the secondary query if the number of vehicles from the secondary query equals a minimum number of vehicles; and repeating these steps until the number of vehicles from the primary and the secondary query equals a minimum number of vehicles to be displayed.

Thus, an aspect of this invention includes providing an easy-to-use, interactive system for an automobile transaction using touch screen technology in combination with video and audio feedback to the customer.

Another aspect of the present invention is to provide a method for capturing customer data only once, storing that data for later access by a follow-up marketing application or a financing and insurance application.

Yet another aspect of the present invention is providing a system which will always display some amount of dealership inventory for every customer query.

Still another aspect of the present invention is displaying a minimum number of vehicles in response to a customer query even if the dealership has fewer than that minimum number currently in inventory.

Another aspect of the present invention includes allowing the customer to review dealership inventory without any sales pressure so as to involve the salesperson only when the customer needs help with the system or when the customer has located a vehicle of interest.

A further aspect of the present invention is the use of touch screen technology to provide a more "user-friendly" experience for an automobile customer and to provide a more reliable input device.

Yet another aspect of the present invention includes modifying a primary multilevel customer query until the query returns a minimum number of vehicles.

BRIEF DESCRIPTION OF THE DRAWING

Figure 6:
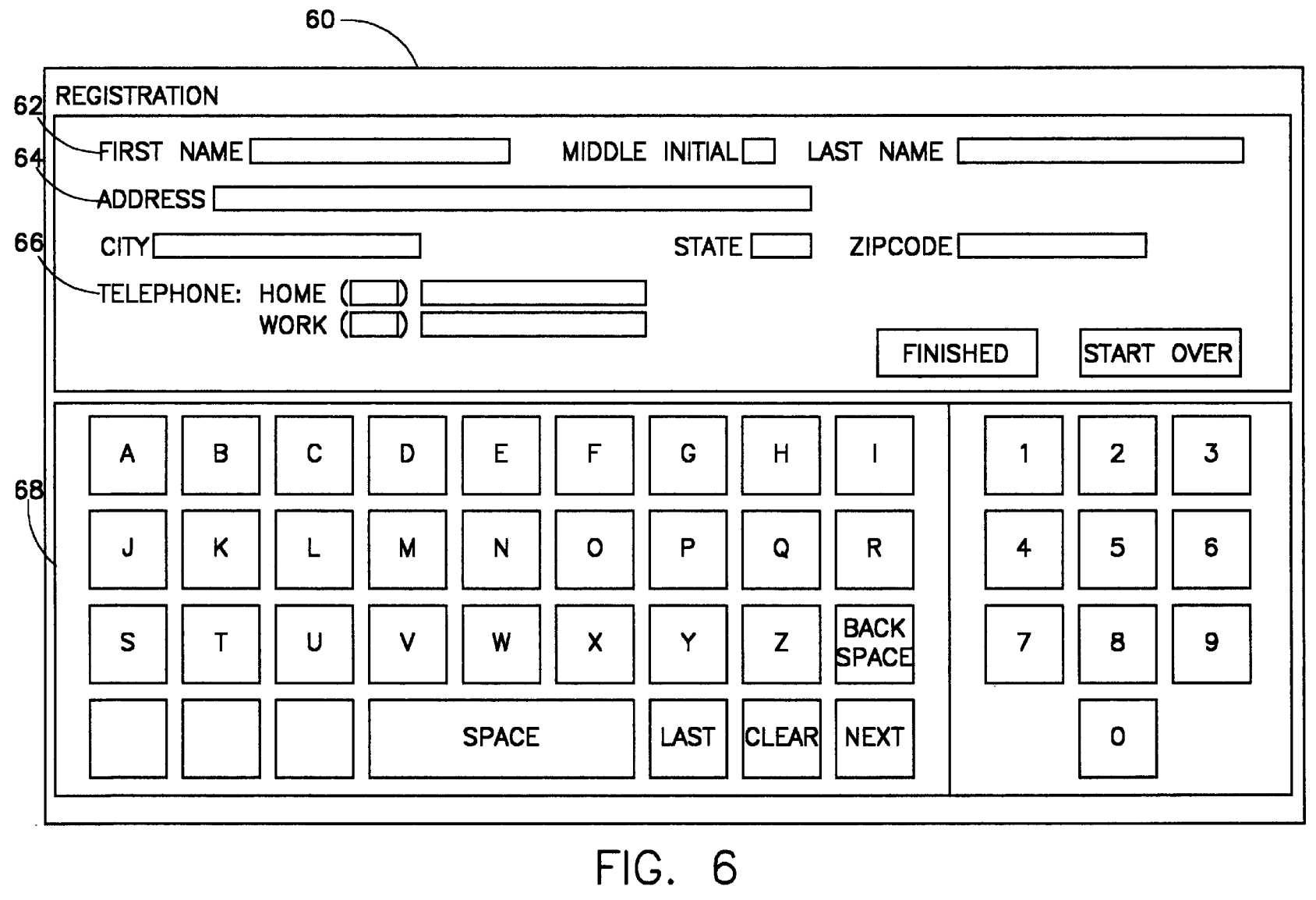

FIG. 6 illustrates the registration screen of the present invention.

FIG. 12A shows the selected inventory screen of the present invention.

FIG. 13 shows the selected vehicle screen of the present invention.

DESCRIPTION OF THE PREFERRED EMBODIMENT

In this description, the term "automobile" will be used to refer to a wide range of vehicles sold at retail by car dealerships to include cars, trucks, vans and sports/utility vehicles. The term "vehicle" as used herein is intended to have the same meaning as the term automobile.

Figure 1:
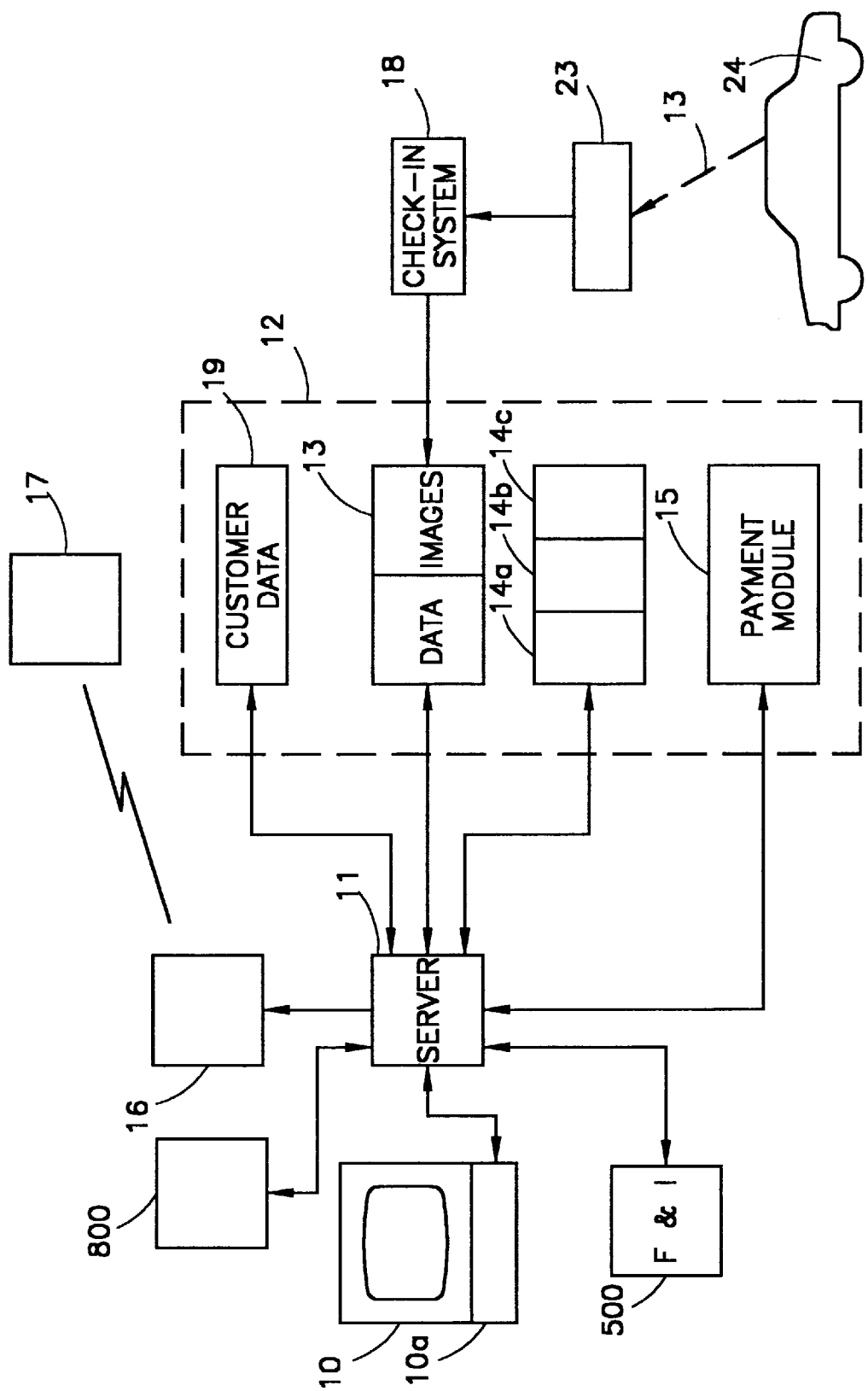
FIG. 1 illustrates components of the system of the present invention.

The diagram in FIG. 1 illustrates the components of a preferred embodiment of the present invention. The system is comprised of a terminal 10, terminal processor 10a, a data server 11, a communications device 16, a storage device 12, and a "linked" salesperson 17. The storage device 12 contains a customer database 19, an inventory database 13, vehicle image files 14, video and sound files 14, and payment module 15. An additional component is check-in system 18 which is interfaced to the storage device 12. The inventory data 12 includes information about each vehicle as shown in Table 1 below.

TABLE 1

| Inventory Data | |
|---|---|
| Model Year | Stock Number |
| Make | Vehicle Identification Number |
| Model | Transmission |
| Body Style | Engine |
| Color | Location |
| Mileage | Features |
| Price | Vehicle Image |

The features information item refers to such things as type radio, cruise control, tilt steering wheel power windows and the power windows and the like which will vary from vehicle to vehicle. This listing is exemplary only and may be expanded to fit a particular vehicle type.

The equipment selected for the data server and the terminal processor should be capable of displaying large image files quickly. Therefore, a preferred device for the terminal processor is a Pentium-based personal computer operating at a clock speed of at least 166 Mhz and having at least 32 Meg of Random Access Memory (RAM). Less capable equipment may be technically capable but may be so slow as to cause customer dissatisfaction with system performance. Desirably, the data server is a dual processor unit operating at a clock speed of 200 Mhz to create a network capable of 100 MPS. The selection of suitable computer equipment for the practice of the present invention is within the skill of one of ordinary skill in the art.

The programming for the present invention can be accomplished with any one of the well-known computer languages. In a preferred embodiment, the Delphi language is used.

The customer data is created and saved as customers are logged in and use the system. This data is comprised of basic information about each customer, such as, but not limited to, name, address and phone number.

The check-in system 18 is a computerized system for capturing information concerning newly-acquired automobiles as they are brought into the dealership. These systems are well known in the automobile business and are available from a variety of vendors. As shown in more detail in FIG. 1A, this system may include a laptop computer for recording inventory data shown in Table 1 for each automobile. The information could include a digital image of the vehicle. Desirably, the images are recorded in the well-known JPEG file format although other images such as MPEG could be used. In order to speed the later processing of the images and to conserve storage device space, the images may be compressed for storage. A typical image file having a size of 1 megabyte could be compressed to about a third that size using well-known compression techniques.

The newly-acquired automobiles must be cleaned and given a mechanical examination prior to being formally added to the dealership inventory in the system. Prior to that time, it is not desirable to make a vehicle available for customer queries generated by the present invention. The practice of the present invention includes providing an interface between the check-in system 18 and the storage device 12 so that periodically data relating to newly-acquired vehicles may be uploaded into the storage device 12. This data concerning the newly-acquired vehicles will not be available for customer query at terminal 10 until dealership management has priced the vehicle and declared it ready for sale.

Terminal 10 accepts customer input and displays the results of system queries. The terminal 10 should include a monitor large enough to permit easy viewing and to accept input using a touch screen. An acceptable monitor is the Viewsonic 17GS. Touch screen technology is preferable for customer input over conventional keyboards because keyboards quickly show wear from heavy use. Additionally, it is believed that touch screens in the long term are more reliable than keyboards. Touch screens are also much more "user-friendly" and less intimidating for some customers. Touch screen technology is well known in the art and will not be explained in detail here. The terminal 10 is connected to a terminal 10a which contains all the executable files and some of the data files required to generate the displays on the terminal 10. The data server 11 acts as an interface between the kiosk processor 10a and the other components of the system.

Figure 2:
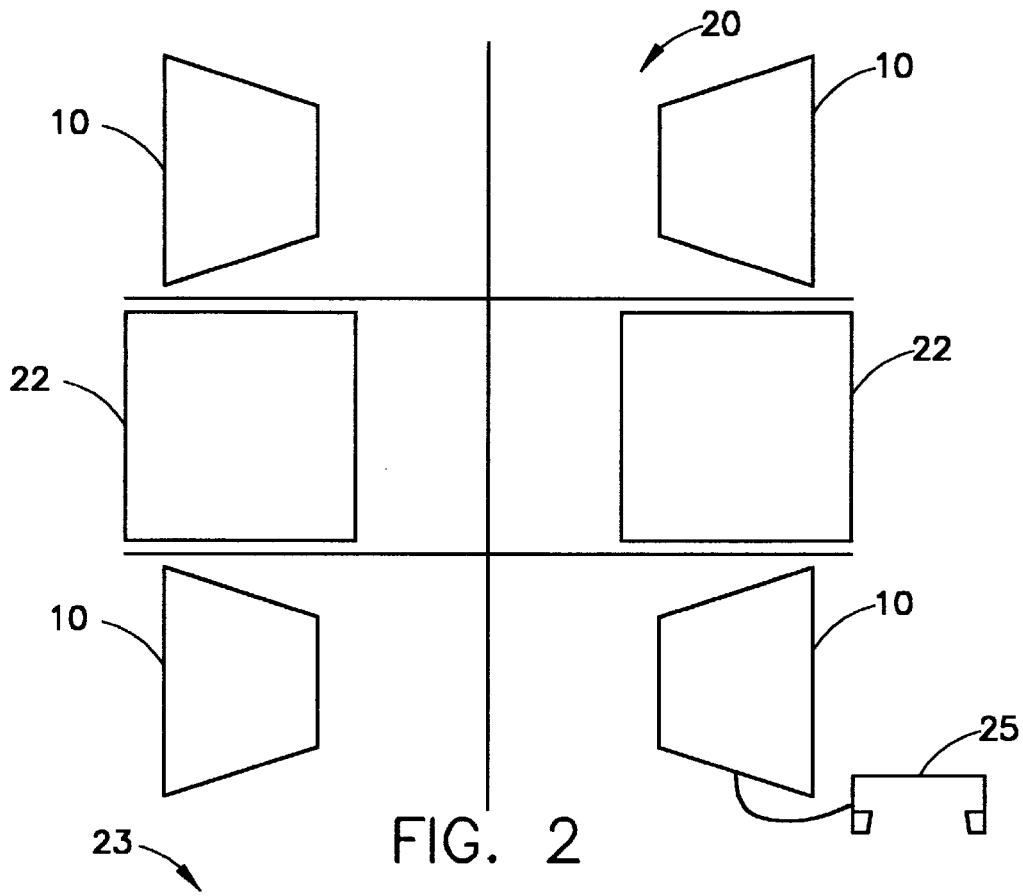
FIG. 2 illustrates a kiosk of the present invention.
Figure 3:
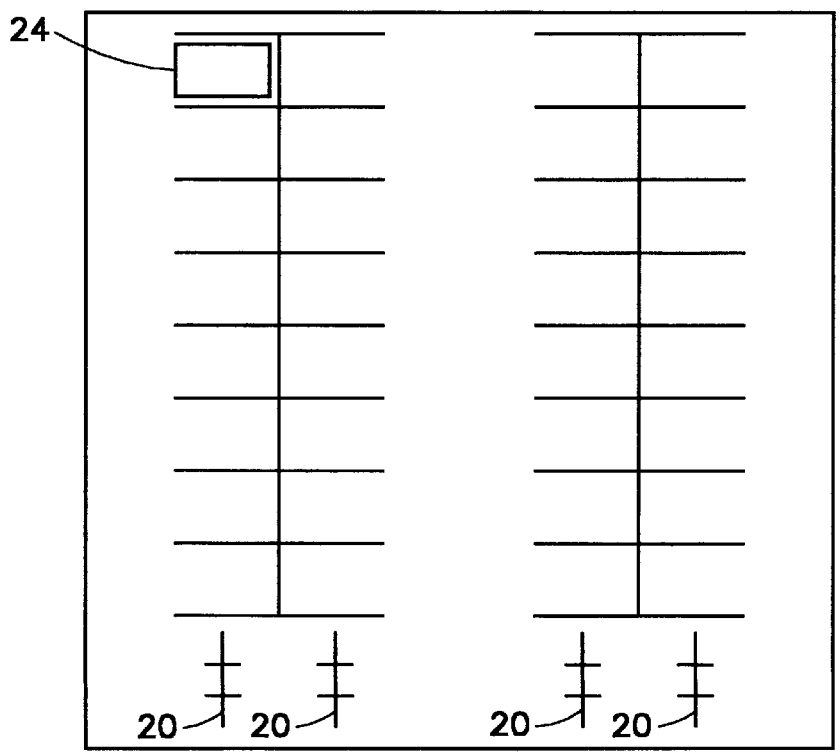
FIG. 3 illustrates a typical salesroom layout incorporating the present invention.

Turning now to FIG. 2, there is illustrated a kiosk 20 of the present invention. The kiosk is made up of four terminals 10 arranged in pairs as shown. Each terminal is provided with its own set of headphones 25 to allow private listening to the audio presentation which accompanies the various system displays. Printers 22 provide a hard copy of the results of system queries as discussed below. In a typical salesroom layout, as shown in FIG. 3, a number of kiosks 20 may be provided in the salesroom 23 in close proximity to the automobiles 24 offered for sale. Other kiosk and salesroom layouts may be created depending on customer volume, available space and economic considerations. Selection of a kiosk configuration is within the capability of one of ordinary skill in the art.

Figure 4:
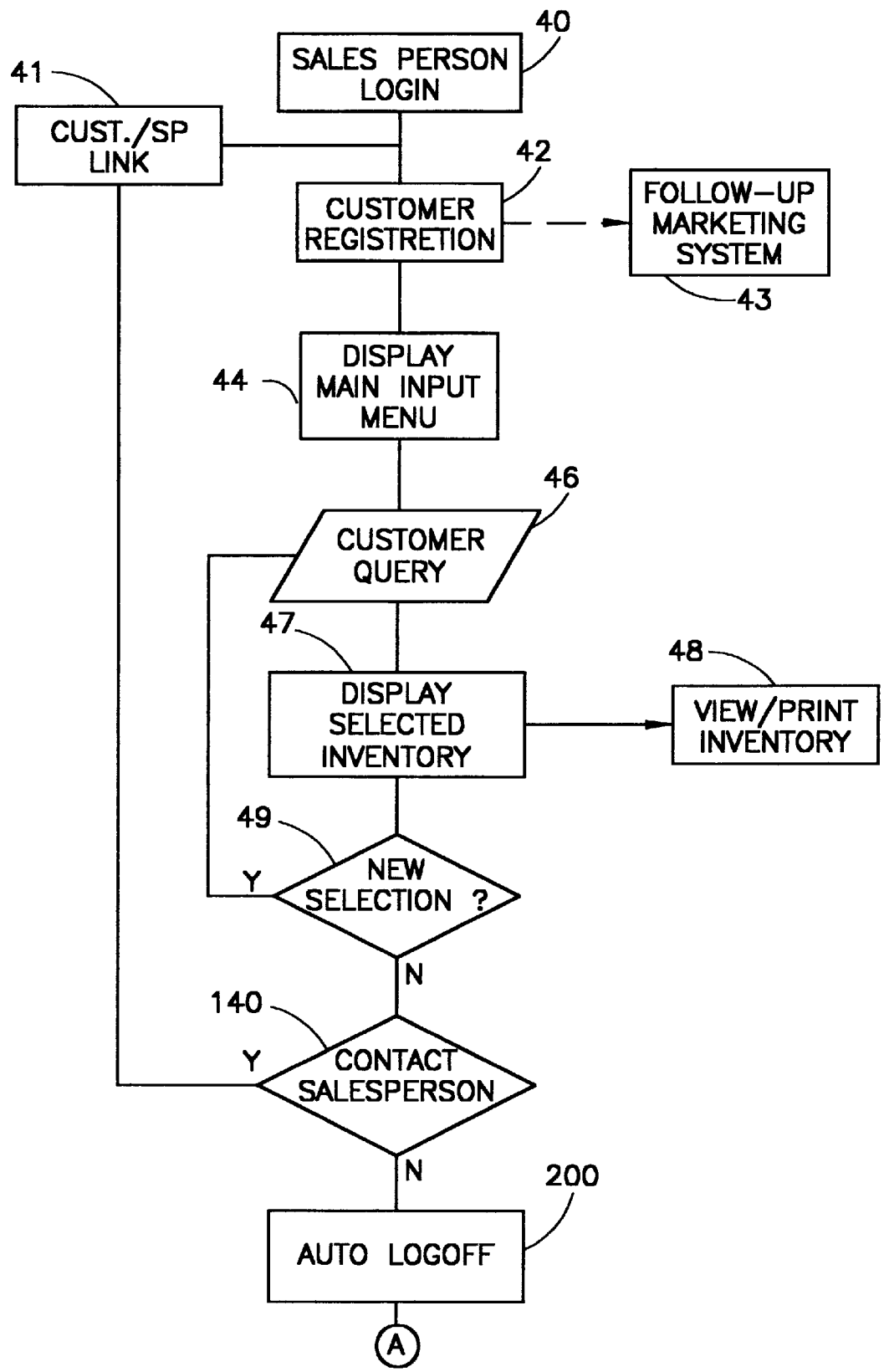
FIG. 4 is a flowchart illustrating the operation of the system of the present invention.
Figure 5:
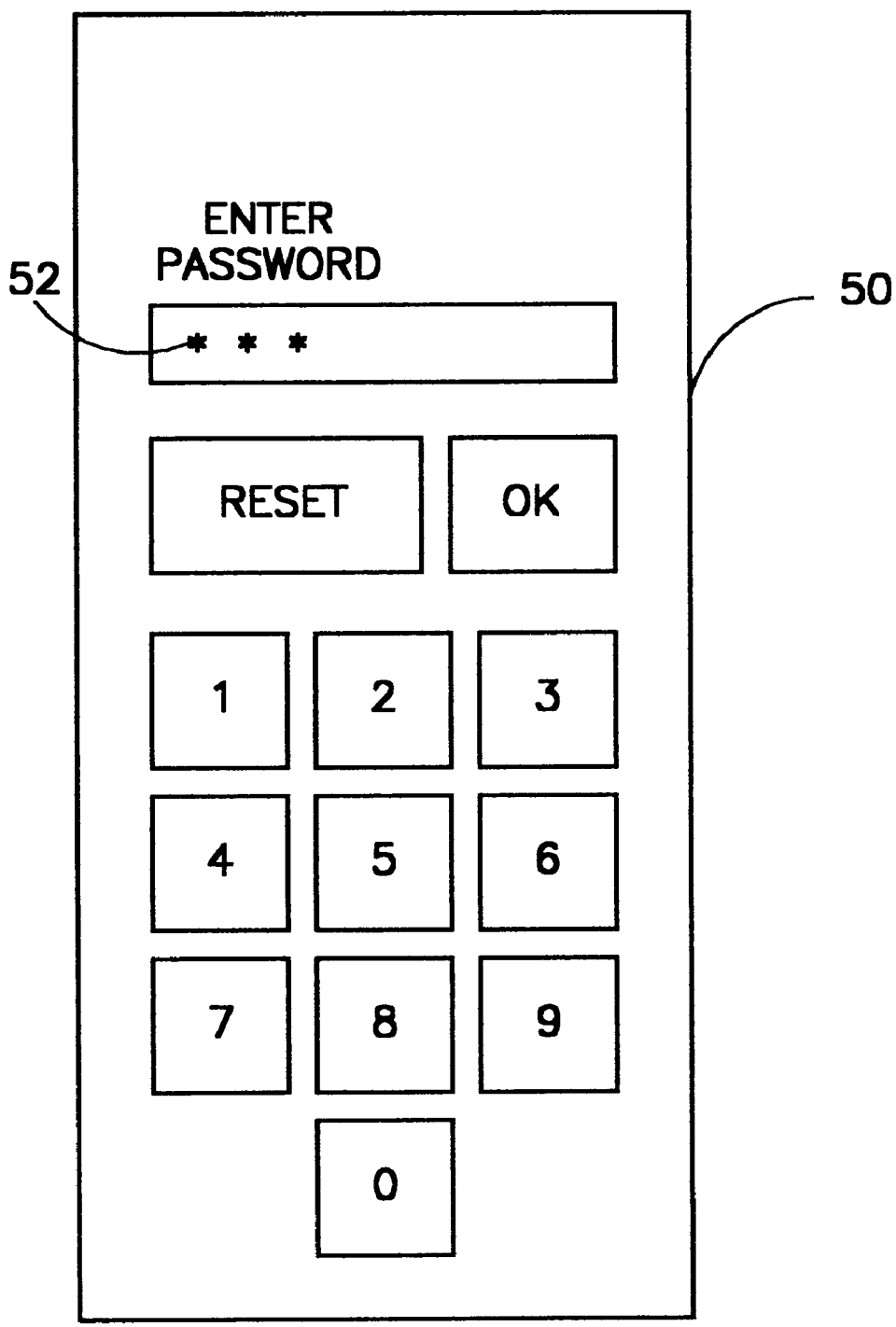
FIG. 5 illustrates the log in screen of the present invention.
Figure 5A:
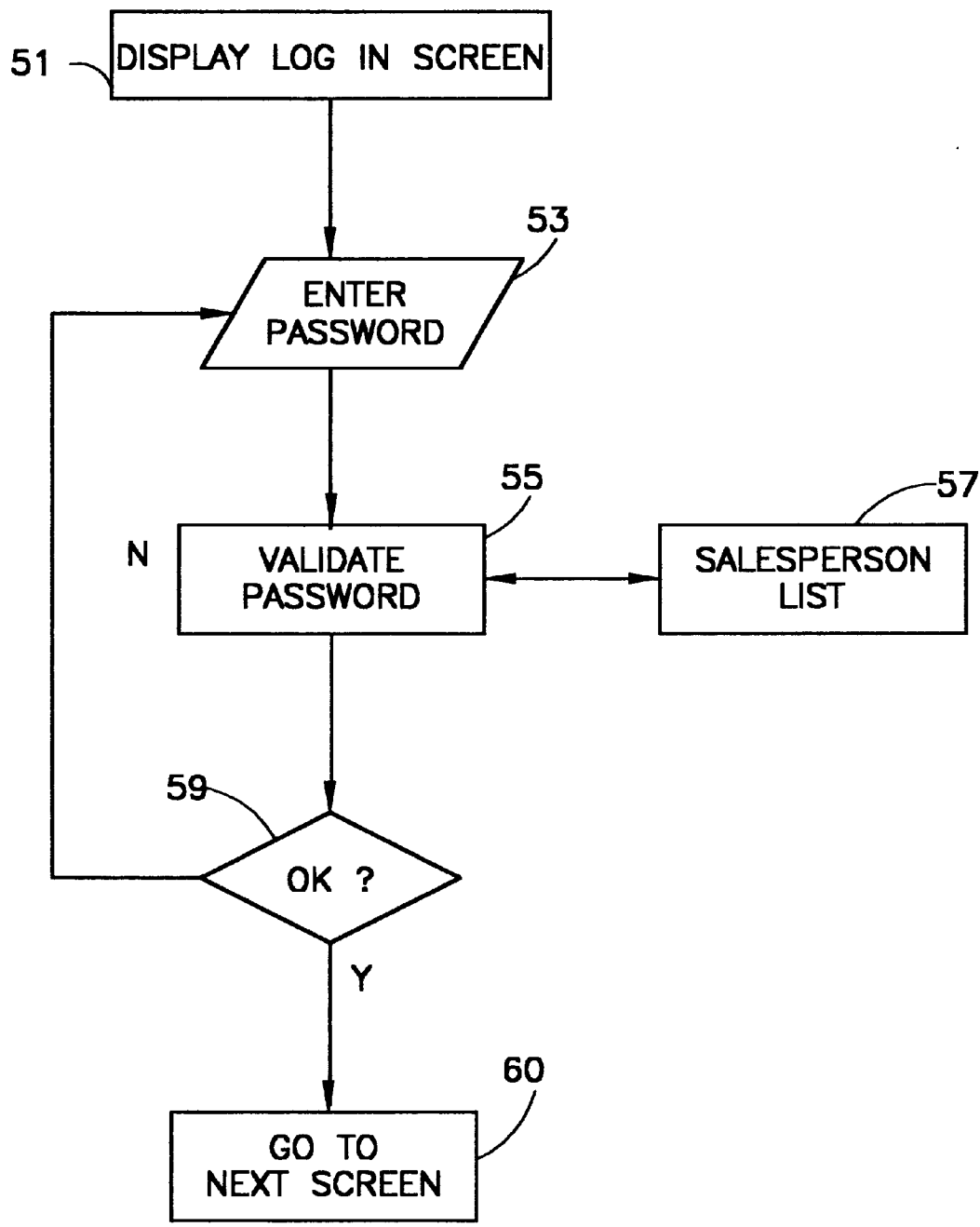
FIG. 5A illustrates the logic steps of the log in screen of the present invention.
Figure 6A:
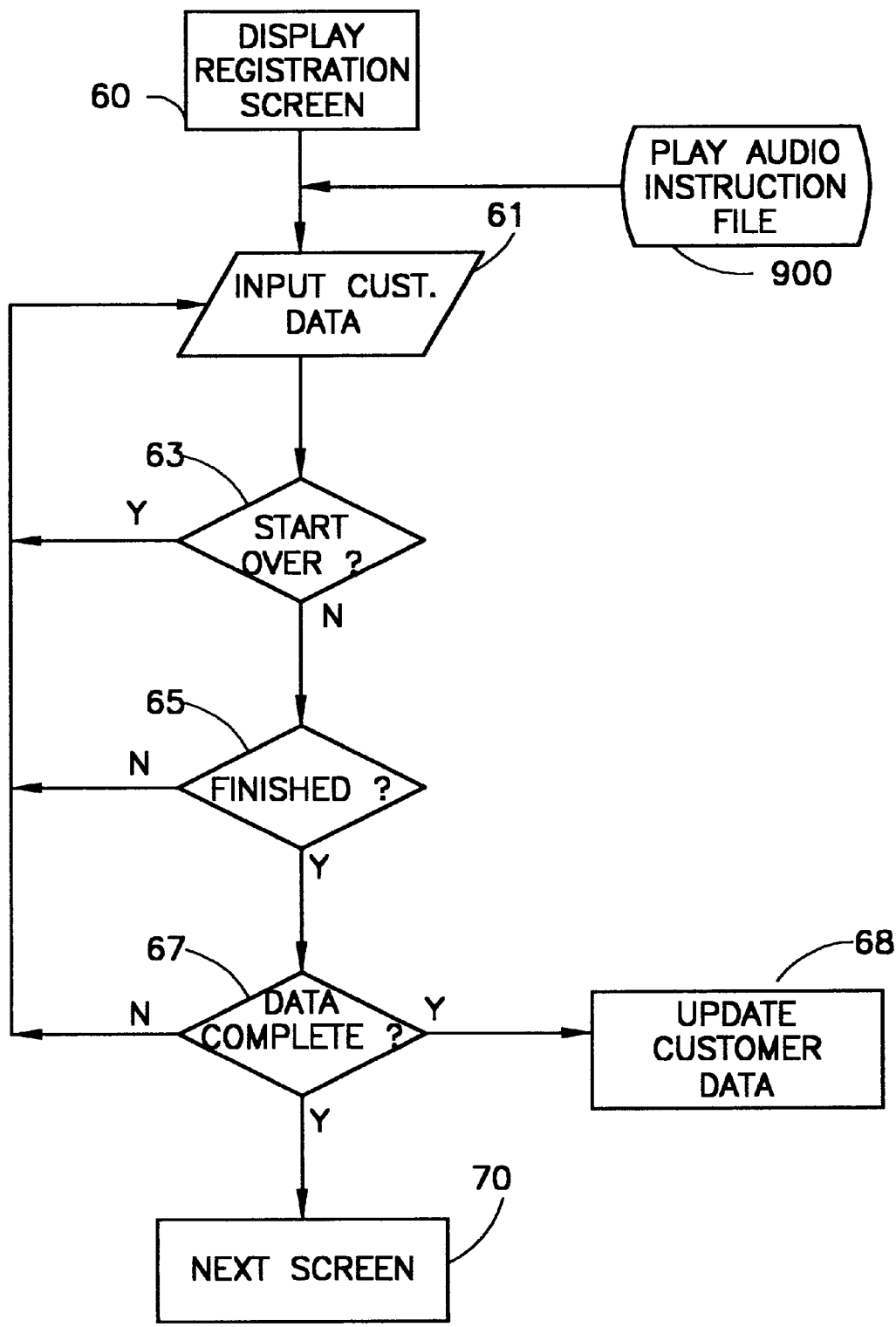
FIG. 6A illustrates the logic steps of the log in screen of the present invention.

The operation of the system will be described with reference to FIGS. 4–14. System operation begins with the assignment of a customer to a salesperson 40. This assignment need not be done formally but could be accomplished by matching up each customer entering the dealership with a salesperson. The salesperson escorts the customer to a kiosk where the terminal processor 10a has displayed a log in screen 50 as shown in FIG. 5. The salesperson then enters a unique password 52 that identifies him to the system so that the system creates a customer/salesperson link 41 (FIG. 4) that is maintained in system memory from that point forward. The log in process is illustrated by the flowchart in FIG. 5A and the logic steps in Table 2 below.

TABLE 2

Salesperson Log In

- Display log in screen. (51)
- Wait for salesperson to enter password and press OK.53
- Password is validated against current list of sales representatives (55, 57) If OK (59) proceed to next screen (60), otherwise force user to re-enter correct password is received.

The customer dons headphones 25 (FIG. 2) and may be greeted with a video presentation welcoming the customer to the dealership. In all cases, the system provides initial instructions on the use of the touch screen by playing the appropriate audio file contained in storage device 12. This presentation, along with all the remaining sound, image and video information provided to the customer, is generated in response to a request from the terminal processor for the video 14a, image 14b and sound files 14c via server 11. These files may comprise any one of the well-known formats to include AVI files for video, JPEG or MPEG files for images, and WAV files for audio/sound. The selection of a particular file format will vary depending on equipment availability and the preferences of the person of ordinary skill in the art assembling the system. The scope of the present invention includes using new, more efficient or capable file formats that will be developed for each of these type files.

Next, the system displays registration screen 60. (See FIG. 6) In this preferred embodiment, a simulated keyboard 68 is provided to enter such customer information as name 62, address 64, and phone number 66. Additional information that could also be captured includes how the customer heard about the dealership and whether she is just browsing or seriously intends to purchase an automobile. Some or all of this information may be transferred via an interface to a follow-up marketing system 43 (FIG. 4). This system may use well-known commercially available contact management software such as GOLDMINE marketed by Goldmine Software Corporation. This software package may be configured to access the customer data to perform follow-up functions. Some additional uses of a follow-up system include generating mailing lists, notifying customers of newly arriving inventory meeting the customer's specific requirements, as well as notifying customers of upcoming sales events. The registration process could also incorporate registering the customer for ongoing promotional giveaways. The flow chart of FIG. 6A and Table 3 below describe the registration process logic steps in more detail.

TABLE 3

Registration Process

- Display registration screen. (60)
- Play registration audio instruction. (900)
- Input customer data. (61)
- If user presses finished button (65), validates that data is complete (67) before proceeding. If data is incomplete or missing, continues to loop as necessary until data capture is complete.
- If start over button pressed, all entries are cleared. (63)
- When finished and data passes validation, add data to customer database. (65)

The audio instruction 900 for each screen will be tailored to that particular screen.

Figure 7:
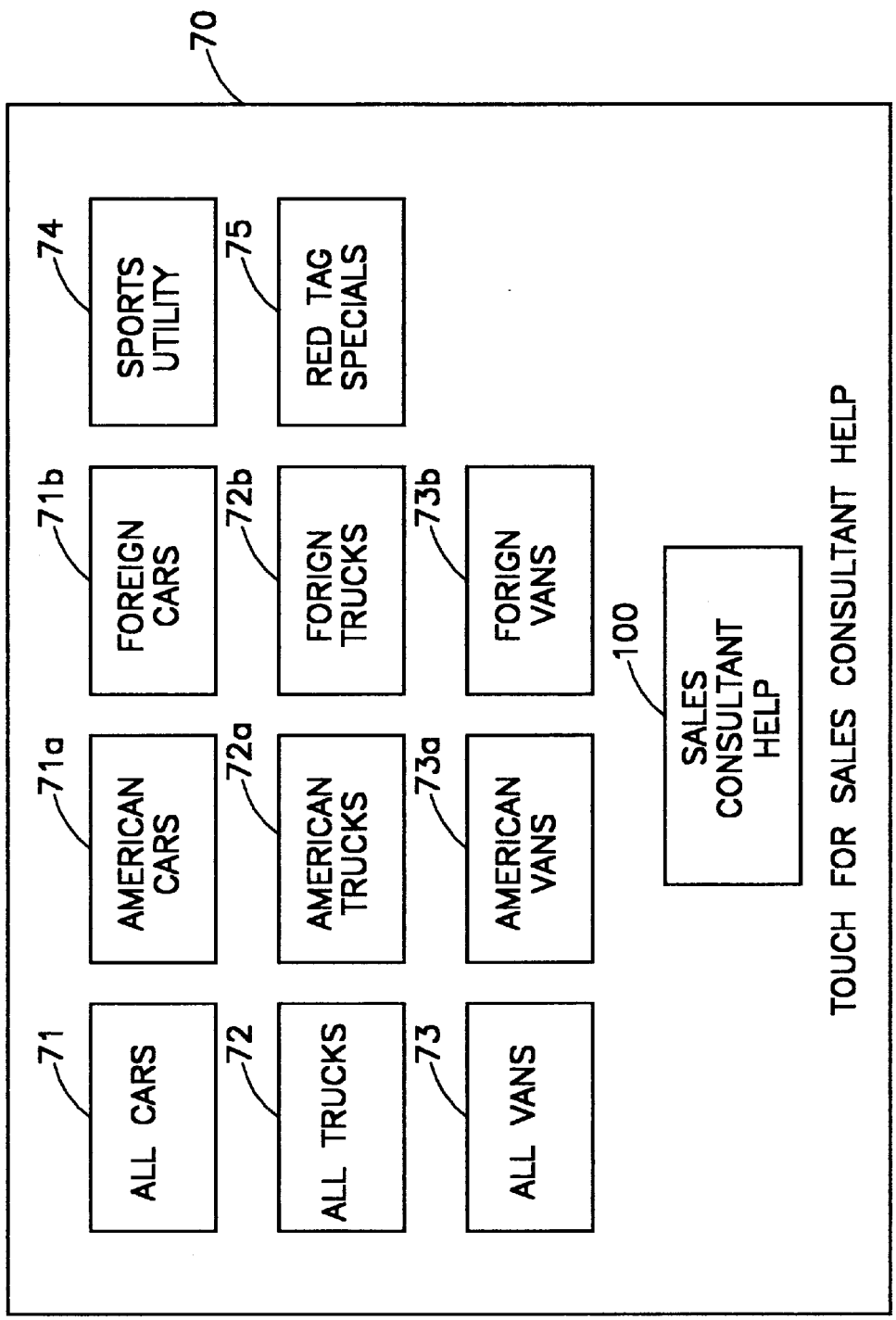
FIG. 7 shows the main menu of the system of the present invention.

The system next displays main menu 70, a preferred configuration of which is illustrated in FIG. 7. This menu 70 is the starting point for building a multilevel, primary customer query of the current dealership inventory for automobiles meeting the customer's needs and preferences.

Figure 7A:
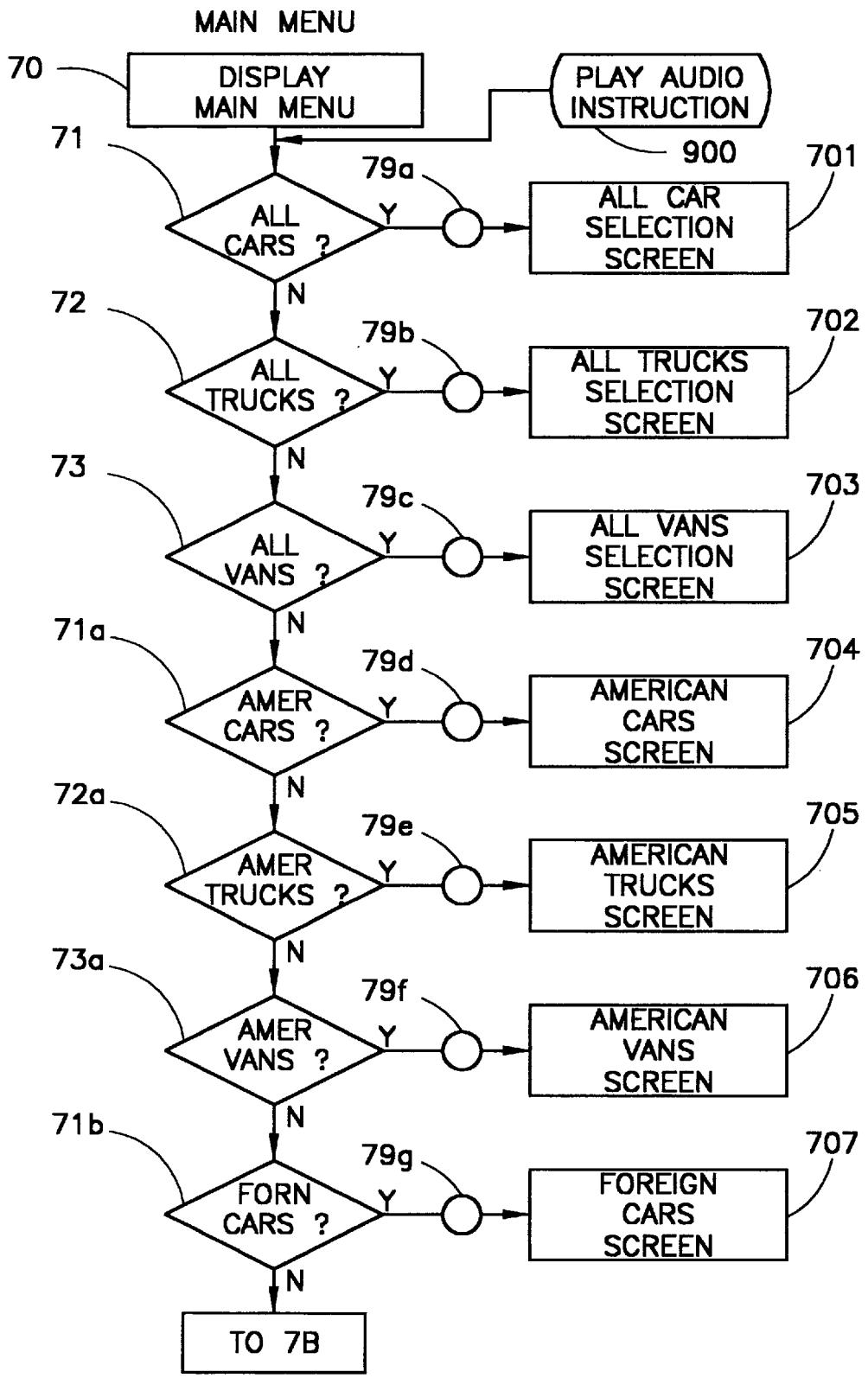
FIGS. 7A, 7B illustrate the logic steps of the main menu of the present invention.
Figure 7B:
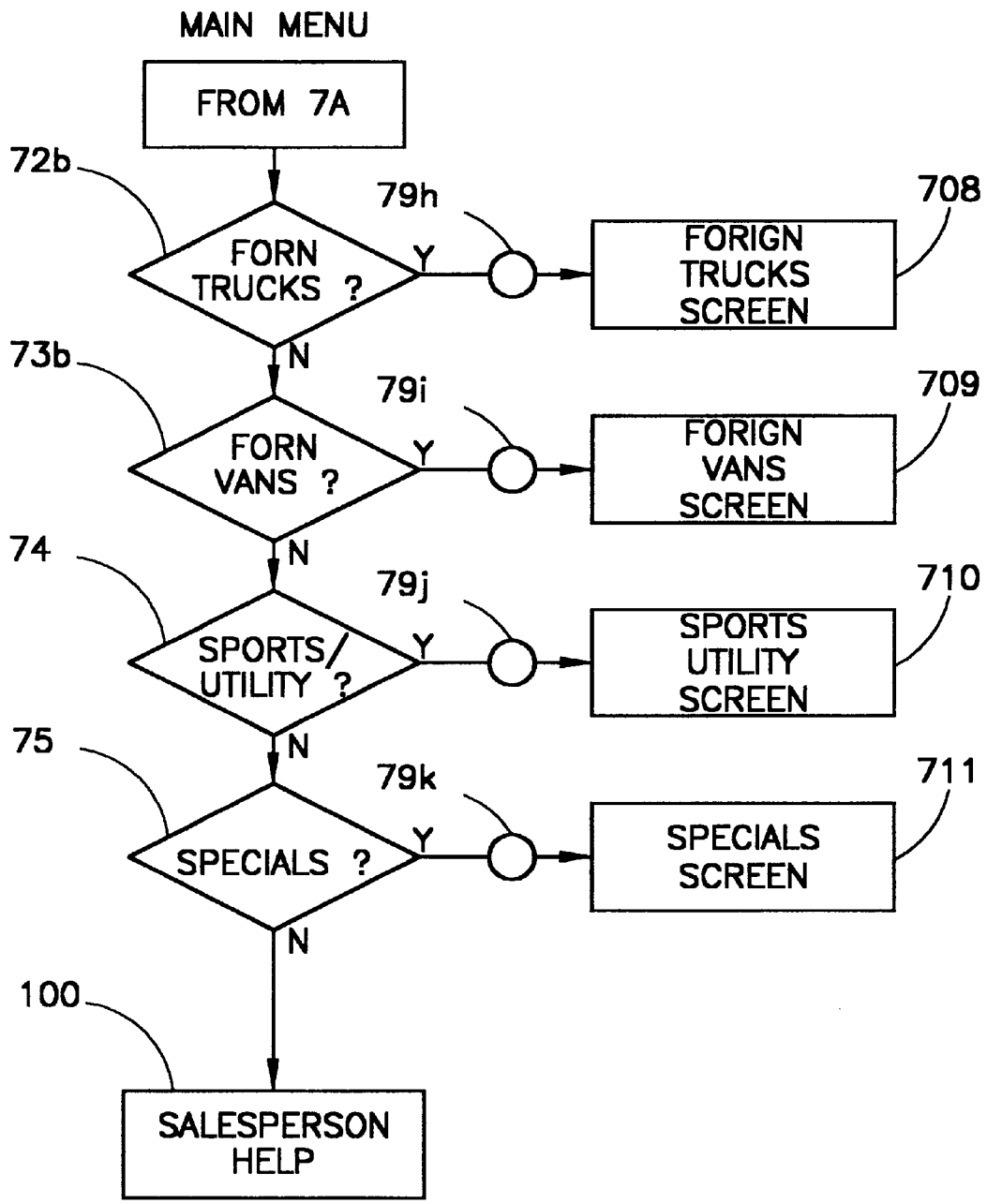

The customer may limit her query to American or foreign cars, vans, or trucks using keys 71a, 71b, 72a, 72, 73a and 73b. Alternatively, if the customer's interests dictate, the query may be limited to sports/utility vehicles using key 74. The selections provided on this menu may be customized for a particular dealer's inventory or modified to include specialty vehicles if carried. For the customer who has no strong preference at this point or who would like to see a large number of automobiles, the menu provides "All Cars," 71 "All Trucks,"72 and "All Vans" 73 options. A "Red Tag Specials" 75 selection carries the customer directly to promotional sales automobiles which could be of any type. This special selection could carry any catchy name designed pull a customer's attention quickly to these vehicles. The operation of the main menu 70 is described in more detail in the flow charts shown in FIGS. 7A, 7 B and in Table 4 below.

TABLE 4

Main Menu Screen

- Display main menu screen. (70)
- Play audio instruction. (900)
- If sales consultant help is selected, then contact salesperson that logged in customer. (100)
- Audio confirms each customer selection. (79a–79j)
- Otherwise, system uses the button pressed to start building a query for selecting vehicles out of the complete available-for-sale inventory. (71–75)

Again, as is the case with each of the system displays, the main menu, when first displayed, is accompanied by the playing of an audio instruction file to guide the customer through the query process. Another feature of each system screen display is the "Sales Consultant Help" 100 selection which, when touched, contacts the linked salesperson as described in more detail herein below.

Figure 8:
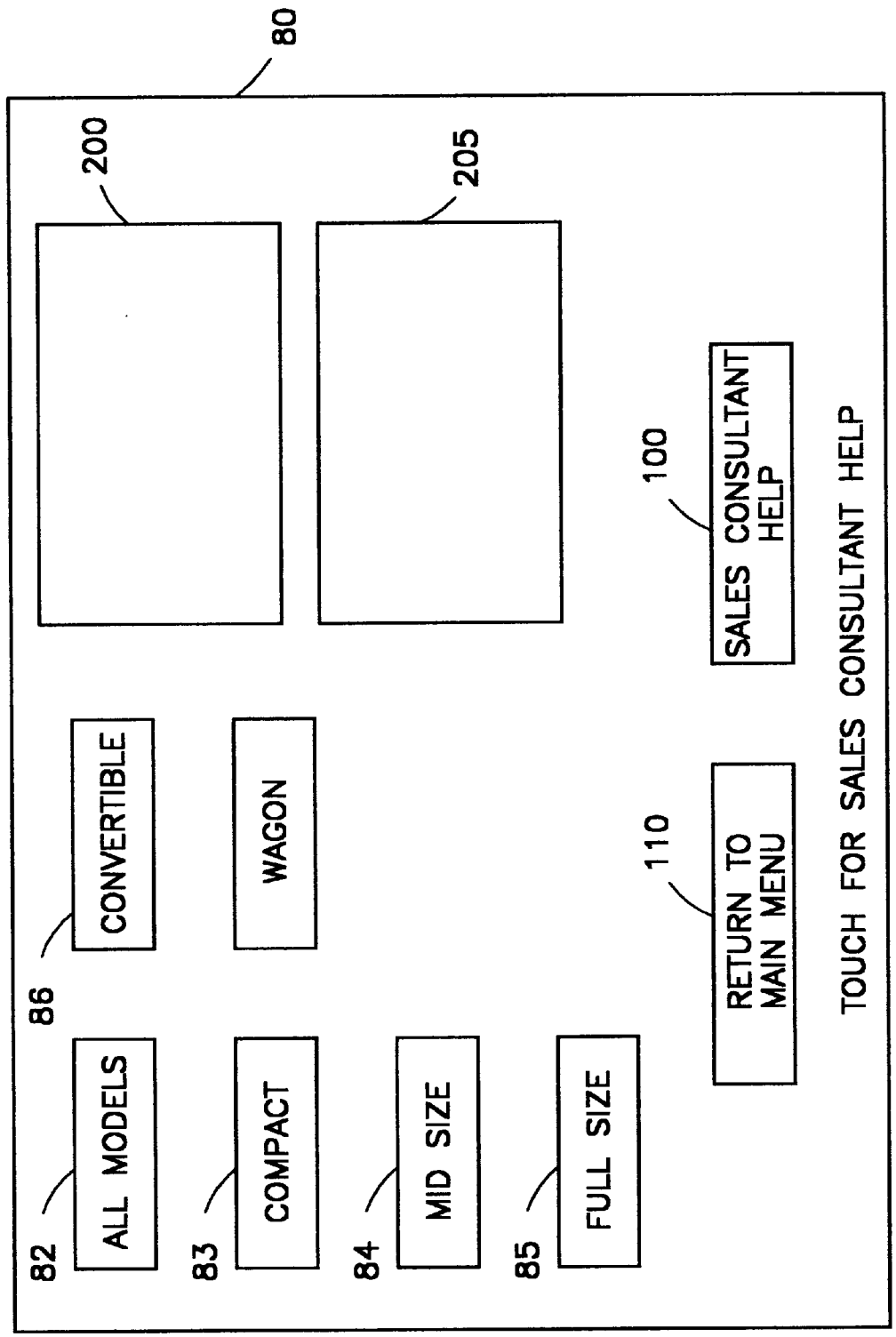
FIG. 8 shows the "All Cars" car selection screen of the present invention.
Figure 8A:
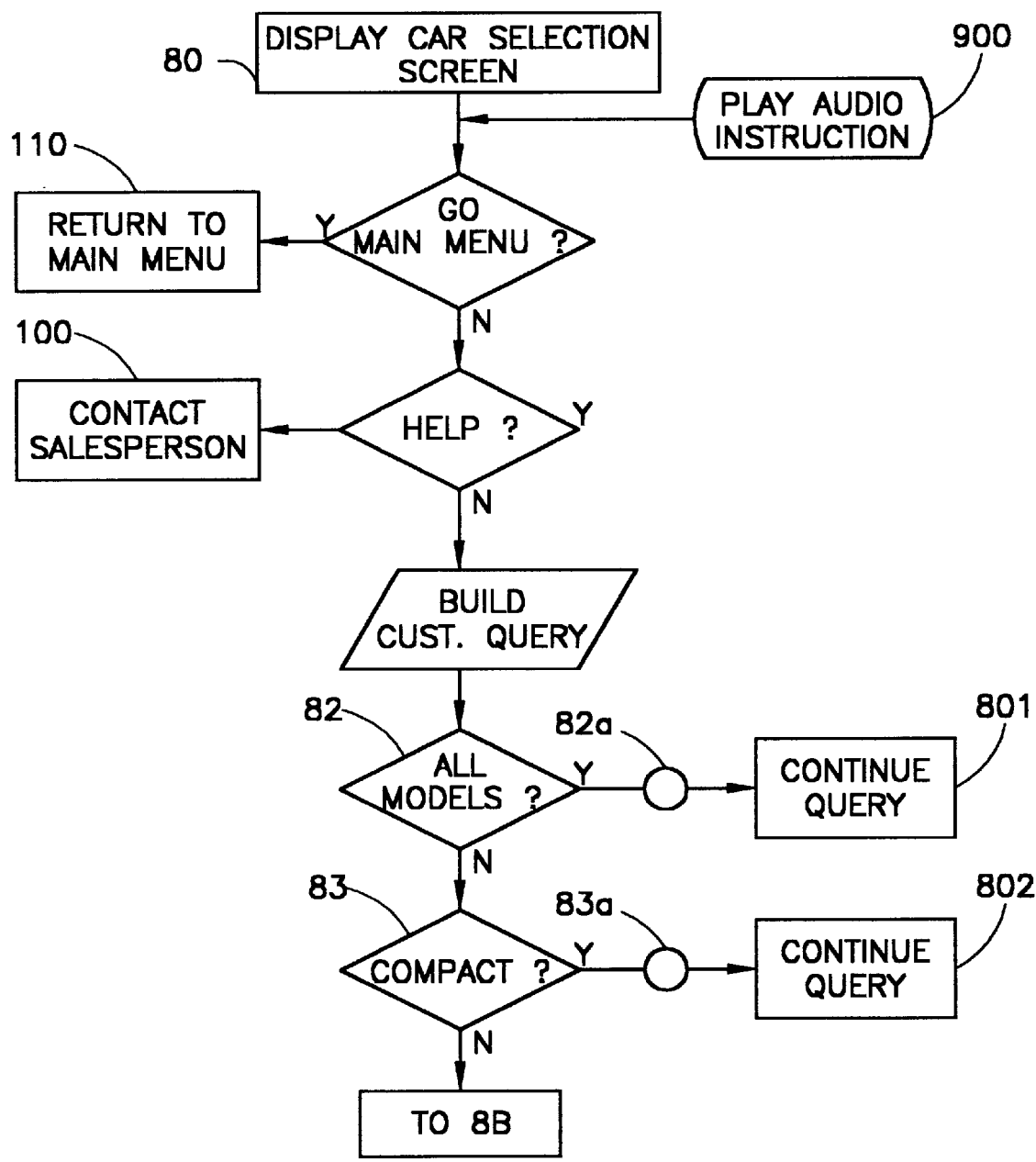
FIGS. 8A, 8B illustrate the logic steps of the "All Cars" car selection screen of the present invention.
Figure 8B:
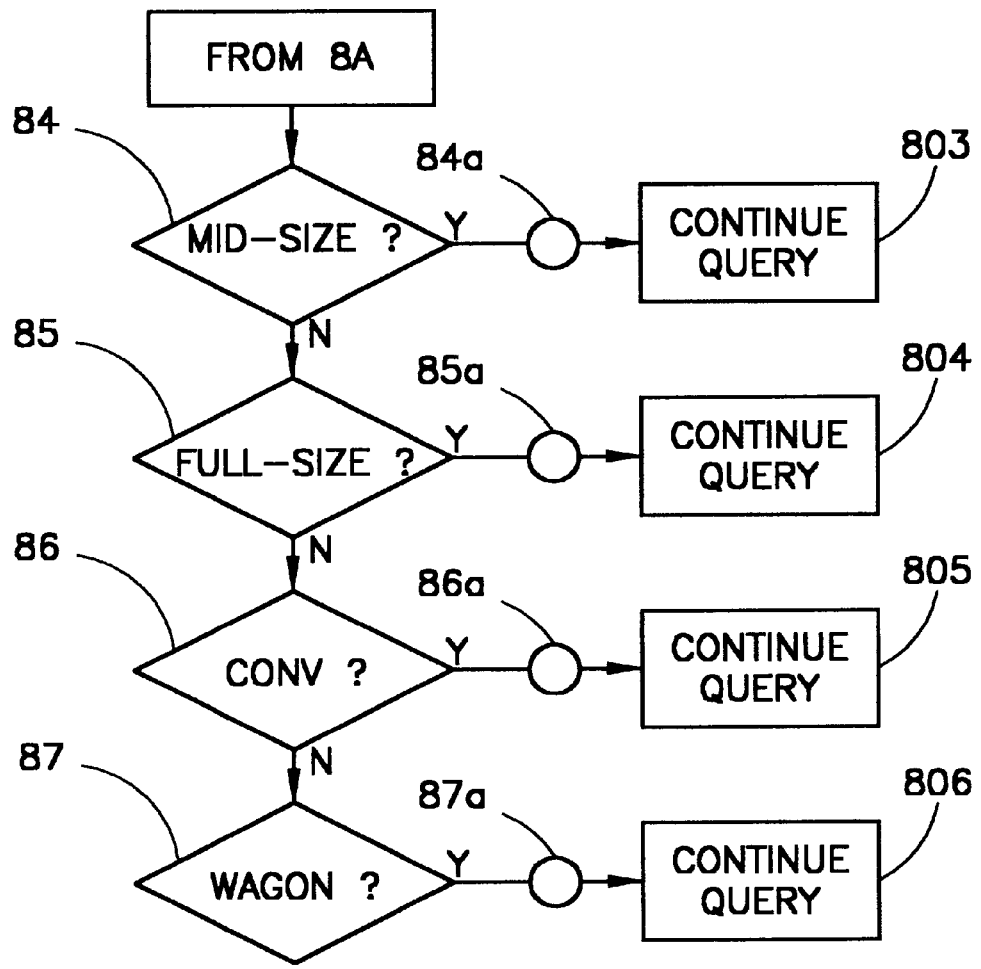

The customer query 46 step will now be further described with reference to building a typical customer query. However, it should be understood that many different routes through the hierarchical menu structure of the present invention are contemplated based on individual customer selections. In this example, the customer selects "All Cars" 71, which displays the car selection screen 80 shown in FIG. 8. The choices offered here include "All Models" 82, "Compact" 83, "Mid-size" 84, "Full Size" 85, "Convertible" 86 and "Wagon" 87. Desirably, images 200, 205 of typical vehicles are also included. However, these images are not a required element of the practice of the present invention. The flow charts shown in FIGS. 8A and 8B illustrate the logic steps associated with the car selection screen 80. Note that each choice made is audio confirmed 82a–87a as it is made. This screen and the screens that follow also incorporate a "Return to Main Menu" 110 selection to allow the customer to restart the query building process if desired.

A somewhat different screen will be displayed at this point if some other selection has been made at the main menu. For example, if a foreign car manufacturer was selected and that manufacturer did not have a wagon in its line, then no wagon selection would be offered. In other words, each screen at this level is customized for the offerings of the particular category of vehicle selected above. The selection could be further customized for the type of vehicles carried by a particular dealership. If a dealership carries no foreign car lines, then there may be no foreign car selection available.

Figure 9:
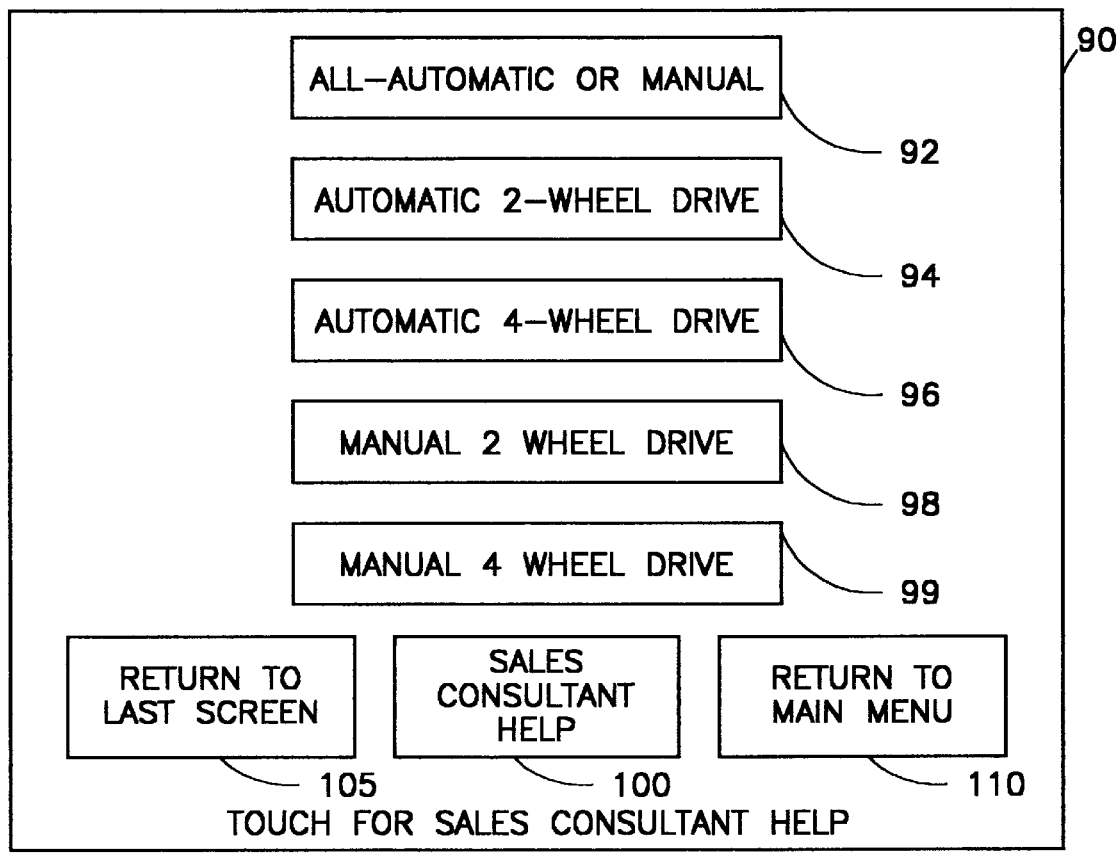
FIG. 9 shows the transmission selection screen of the present invention.
Figure 9A:
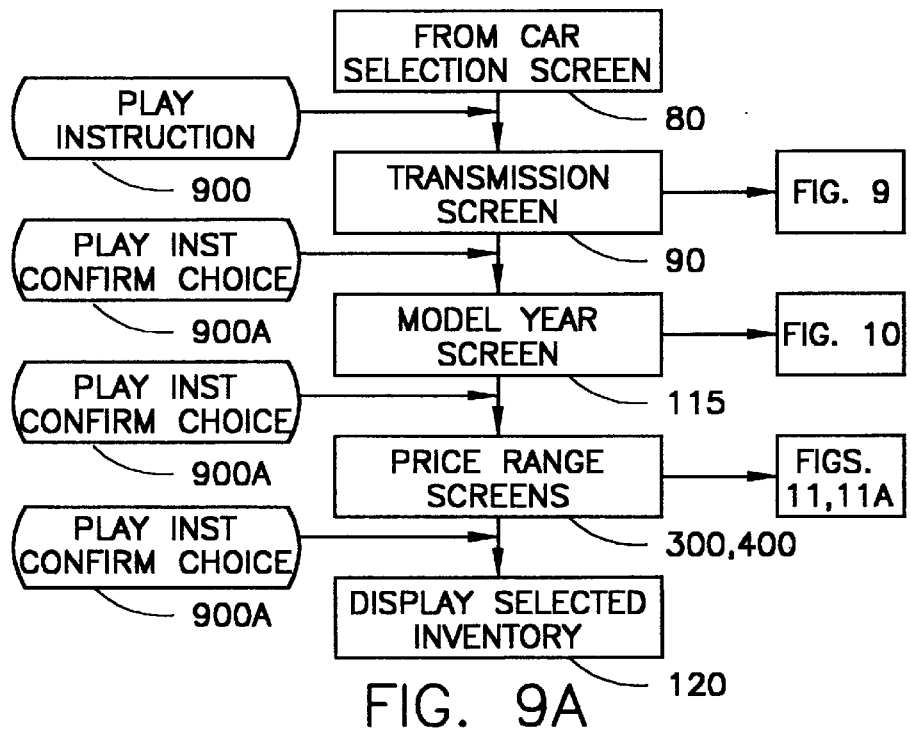
FIG. 9A shows the logic steps of the car selection process of the present invention for the steps after the "All Cars" selection screen.

The remaining steps in the query building process will be described in conjunction with the more condensed flow chart shown in FIG. 9A. After making a selection at the car selection screen 80, the customer is taken to transmission selection screen 90 shown in FIG. 9 where the customer will be prompted to make a transmission selection choice. If a particular transmission is not desired, the "All—Automatic or Manual" 92 selection is used. Otherwise, in this example, four popular configurations 94,96,98,99 are available. The choice of transmissions may be limited at this point based on the car line selected earlier n the process. For example, if a luxury car line having no manual transmission models is selected, no manual transmission options would be presented at this level. The audio prompt at this point may explain the benefits/features of each type of transmission/drivetrain configuration offered. The logic steps for the operation of the transmission selection screen are shown in Table 5 below.

TABLE 5

TRANSMISSION SELECTION SCREEN

● Display transmission selection screen.
● Play audio instruction.
● If return to last screen button pressed, then jump back one screen.
● If return to main menu button pressed, then go back to main menu screen.
● If sales consultant help selected, then contact linked salesperson that logged in customer.
● Otherwise, use the button pressed to continue building the query. Audio confirms each selection.

Figure 10:
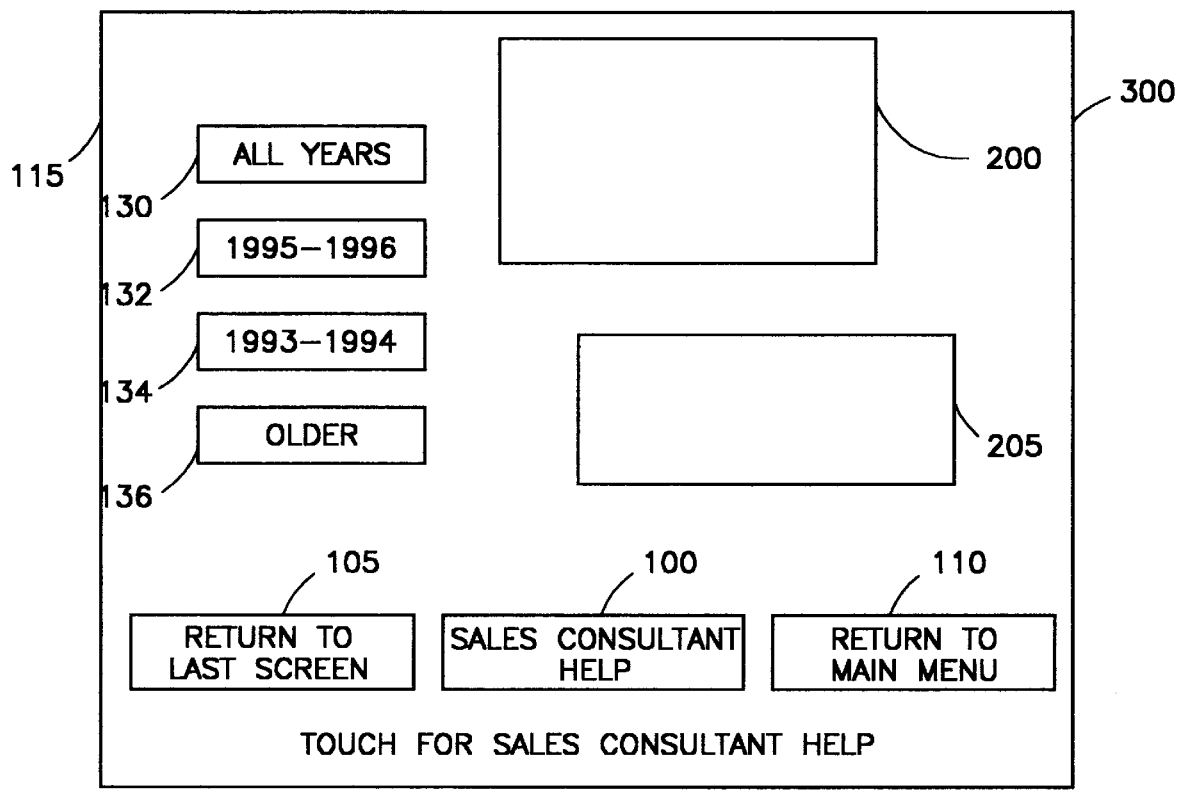
FIG. 10 shows the model year selection screen of the present invention.

The next screen to be displayed is the vehicle year screen 115 shown in FIG. 10. Again, images 200, 205 of available inventory are displayed to maintain customer interest. In similar fashion to that described above, the customer makes the desired choices from available selections 130, 132,134, 136. The logic steps associated with the vehicle year screen are shown in Table 6 below.

TABLE 6

YEAR SELECTION SCREEN

● Display year selection screen
● Play audio instructions
● If return to last screen button pressed, then jump back one screen.
● If return to main menu button pressed, then go back to main menu screen.
● If sales consultant help selected, then contact linked salesperson that logged in customer.
● Play confirmation audio for each button pressed.
● Otherwise, use the button pressed to continue building the query.

Figure 11:
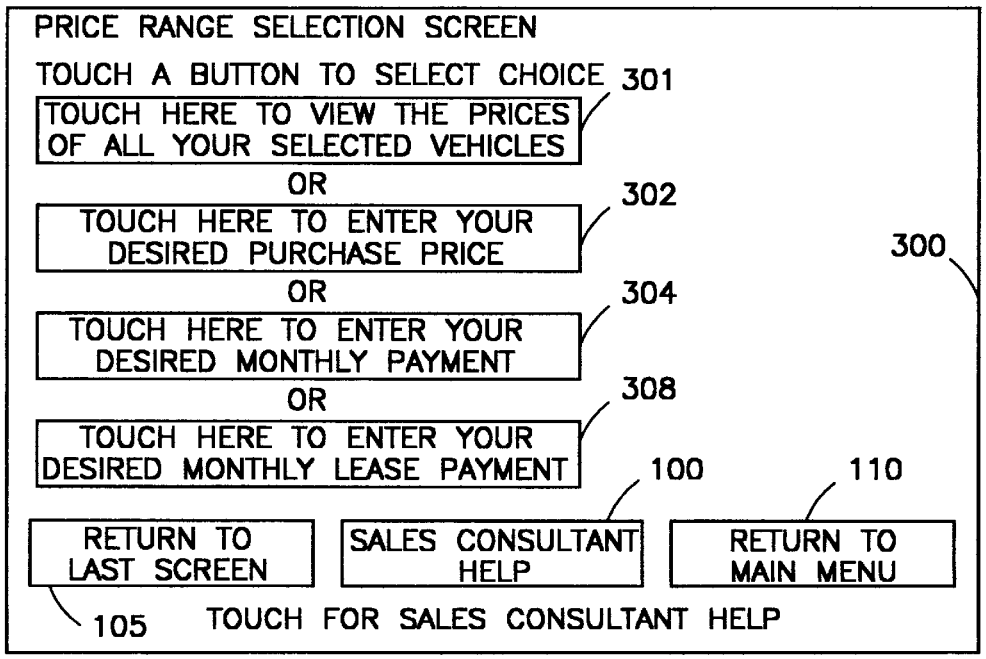
FIG. 11 shows the first price range selection screen of the present invention.
Figure 11A:
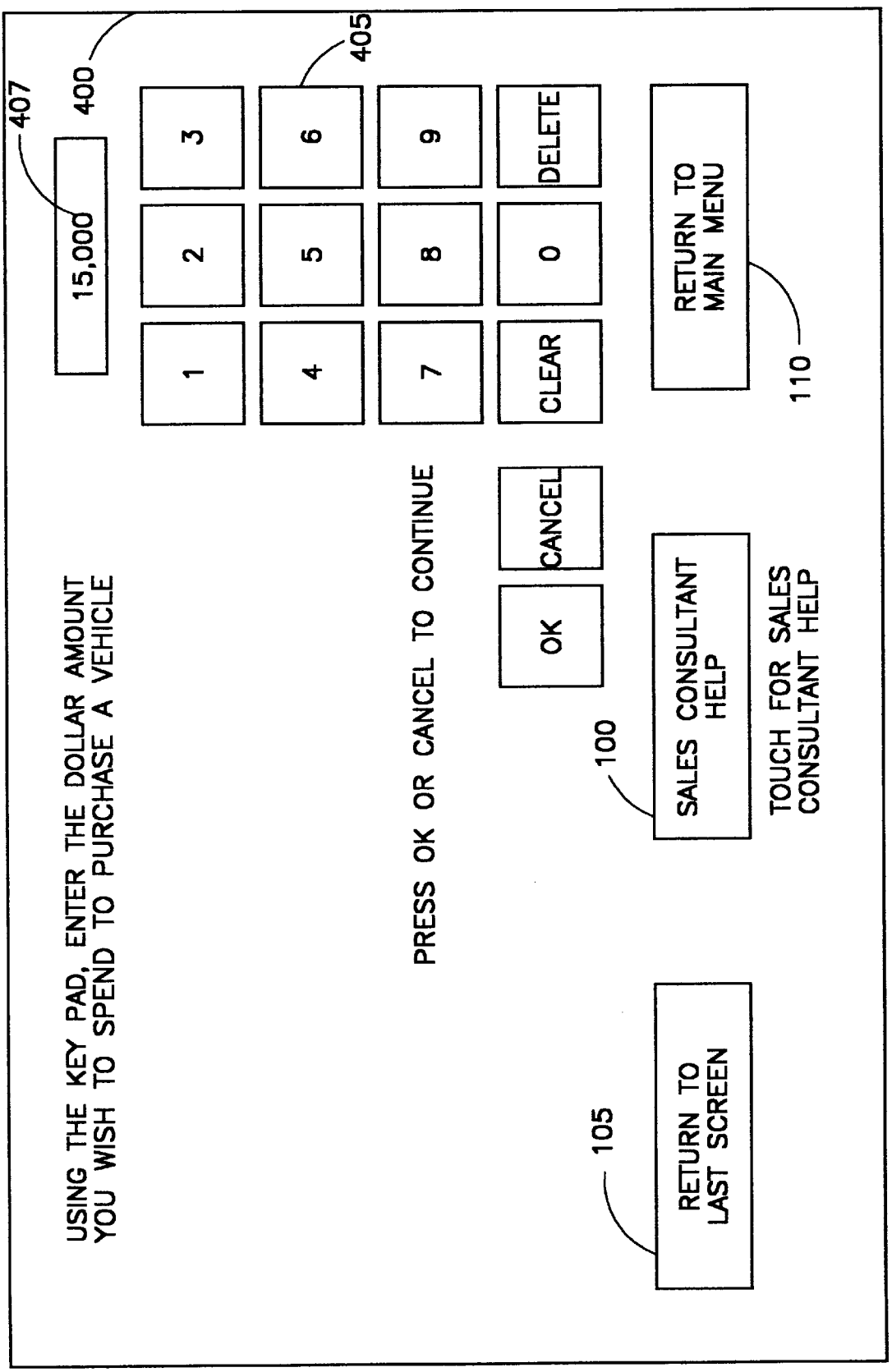
FIG. 11A shows the second price range selection screen of the present invention.
Figure 12:
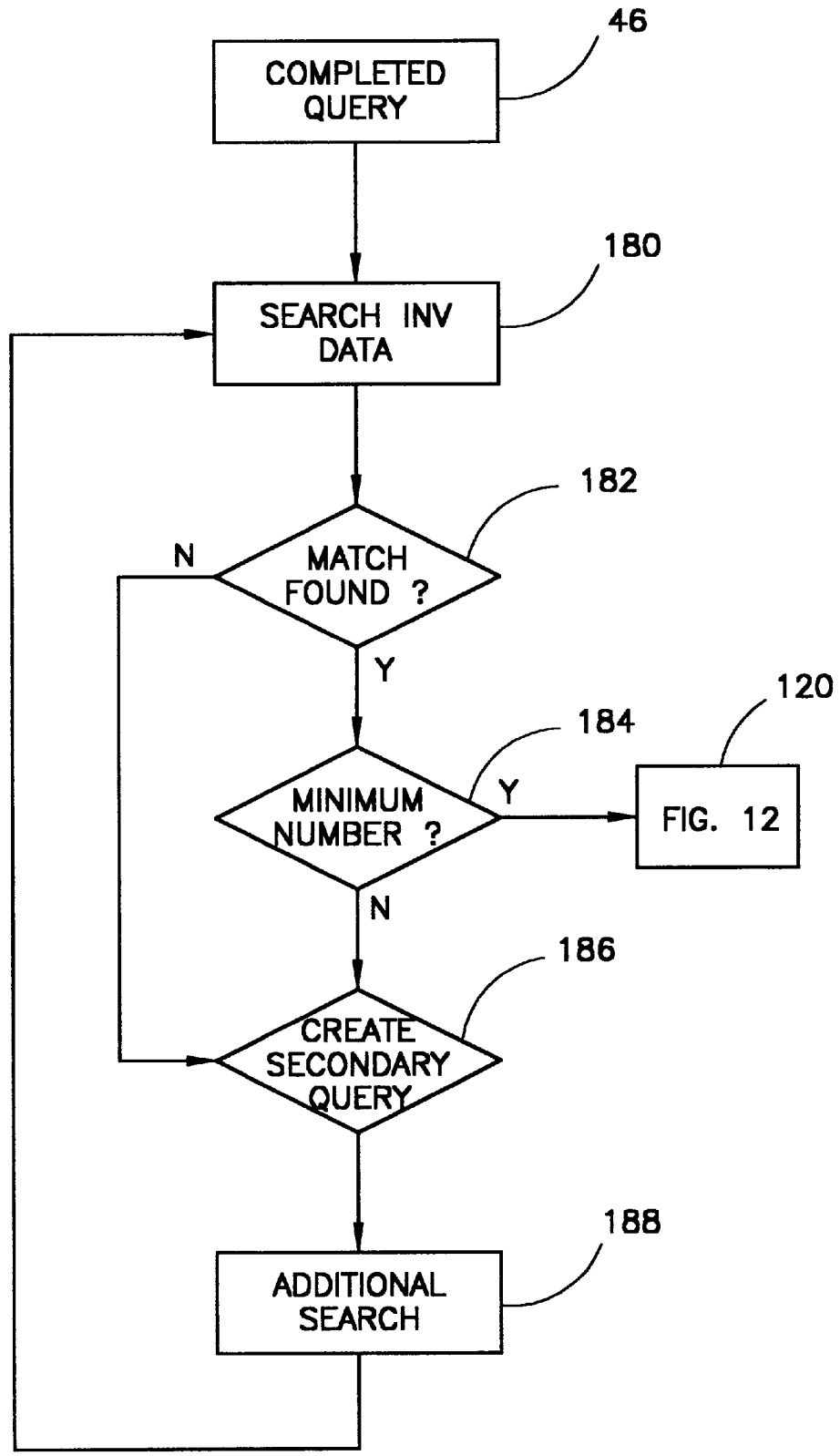
FIG. 12 shows the vehicle selection screen of the present invention.
Figure 14:
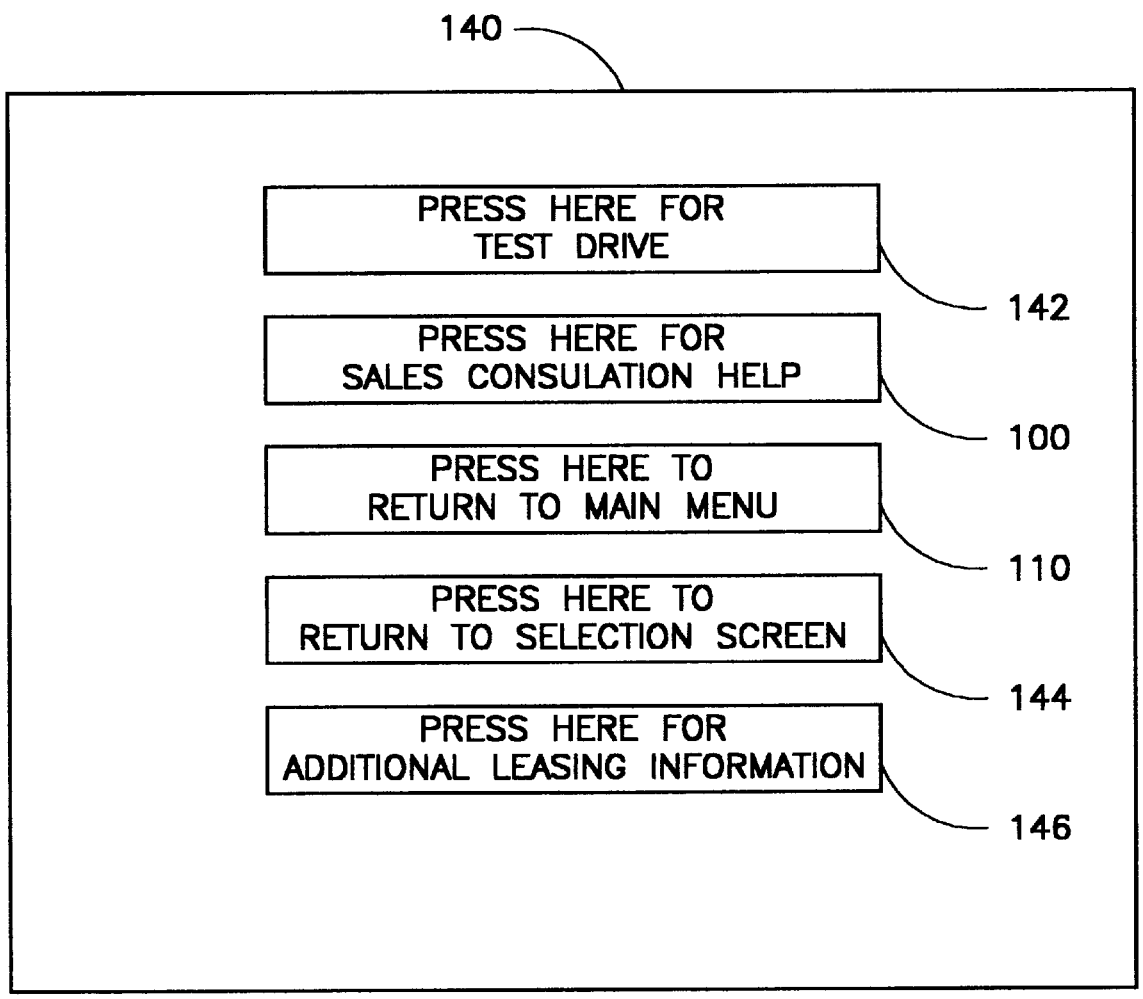
FIG. 14 shows the final decision screen of the present invention.

The next selections are made on the price range screens 300, 400 (FIGS. 11, 11A) where the customer further narrows the query by indicating how much he would like to pay for the vehicle. The system is flexible in that it provides the customer the option to enter a desired purchase price 302, a desired monthly purchase payment 304, or a desired monthly lease payment 308. Some customers may not desire to limit their query by price at this point in the process. Accordingly, selection 301 displays the prices of all selected vehicles meeting the query limitations without regard to price. The customer may always use the "Return to Last Screen" 105 selection to step backwards through the process to limit the query by price after viewing a listing of all prices. Prices range screen 400 features keypad 405 used to enter the appropriate dollar amount 407. The logic steps associate with the price range screens are shown in Tables 7 and 8 below.

TABLE 7

PRICE RANGE SELECTION SCREEN 1
(FIG. 11)

● Display price selection screen
● Play audio instructions.
● If return to last screen button pressed, then jump back one screen.
● If return to main menu button pressed, then go back to main menu screen.
● If sales consultant help selected, contact linked salesperson that logged in customer.
● If user selects view prices of all selected vehicles, display vehicles meeting user criteria.
● If desired purchase price selected, then display price range selection screen.
● If desired monthly payment selected, then display price range selection screen.
● If desired leasing monthly payment selected, then display price range selection screen.
● Audio confirms each selection by customer.

TABLE 8

PRICE RANGE SELECTION SCREEN 2
(FIG. 11A)

● Display price selection screen 2.
● Play audio instructions.
● If return to last screen button pressed, then jump back one screen.
● If return to main menu button pressed, then go back to main menu screen.
● If sales consultant help selected, then contact linked salesperson that logged in customer.
● Otherwise, wait for customer to enter an amount using the calculator keypad and press OK to proceed. Any amount is valid, except for zeros or no numbers entered.
● Audio confirms each selection by customer.

As each of these query elements are input by the customer, a query statement is generated by the terminal processor 10a. As will be obvious to one of ordinary skill in the art, a large number of permutations are possible for a query statement.

After a complete query 140 is formulated, terminal processor 10a searches inventory data 13 in storage device 12 for a selected inventory meeting the customers primary query. 182 (See FIG. 12) If a match is found 182, the system then checks for a minimum number of items 184 returned. When both those conditions are met, the system displays the vehicle selection screen 120 of FIG. 12.

The selected inventory feature of the present invention includes two novel aspects to increase customer satisfaction. First, if none of the dealership inventory matches the customer query exactly, terminal processor 10a automatically modifies the primary query to create a secondary query 186 so that at least one vehicle is displayed. This secondary query 186 can be created by deleting query elements such as transmission type or model year one at a time and conducting additional searches 188 of the database 12 between deletions. The progressively broader search will, at some point, return matching inventory items. An alternative method for broadening the query is to change the ranges for each search element. For instance, if cars within a certain price range have been selected, that price range will be expanded until inventory matches are made.

The second aspect of the selected inventory feature concerns the number of items returned in response to a query. The scope of the present invention includes selecting a minimum number of inventory items to be displayed in response to any query. For instance, the system could show at least ten vehicles for every query. If only four vehicles in current inventory match query elements, then additional items that come close to meeting those elements are displayed. A supplementary display may be provided to inform the customer that, for example, only four items were found that matched the query but that an additional six items are being shown that are similar. This second aspect of the selected inventory concept may be implemented by using the elements of the customer query as the mid point of a range to be searched. For example, the search of inventory data 13 for the primary query could be conducted in all cases to locate vehicles having a purchase price within $1,000 of the exact dollar value entered by the customer. Alternatively, the search based on monthly payments (for purchase or lease) could be conducted using a range of $50 around the exact amount entered by the customer. Desirably these ranges are increased as the amount of the selected purchase price or the monthly payment increases.

The practice of the present invention includes providing customers with comparative competitive makes of automobiles that, while not matching the customer query exactly, do come close to meeting customer preferences. For instance, if the customer has requested a selected inventory from a single auto maker, the query modification procedure discussed above would provide automobiles having similar characteristics from other lines in the dealership's inventory.

Turning now to FIG. 12A, there is shown the selected inventory screen 120. (See step 47 in FIG. 4) As described above, the selected inventory is at least all vehicles that match the customer query exactly and could include additional similar vehicles. This screen displays basic information about each vehicle, which, in this non-limiting example, includes year, make, model, body type, color, engine, transmission, mileage and price. The customer may select individual vehicles for display of an image and more detailed information. If there are more vehicles to show than will fit on one screen, "Page Up" 125 and "Page Down" 126 keys are active on the screen. Desirably, the screen will also display the total number of screens available for viewing. The logic steps for the selected inventory screen are shown below in Table 9.

TABLE 9

INVENTORY SELECTION SCREEN

● Display selected inventory.
● Play audio instructions.
● If return to last screen button pressed, then go back one screen.
● If return to main menu button pressed, then go back to main menu screen.
● If there are multiple pages of vehicles for display, then display and make active page-up and page-down keys.
● If user touches the line where a vehicle is displayed, then display selected vehicle screen.
● Audio confirms each customer selection.

The customer then touches the description of a particular vehicle to see more detailed information as shown in the Selected Vehicle Screen 130 in FIG. 13. This screen includes an image 160 of the vehicle along with either the purchase price or a monthly payment amount for a purchase/lease. (The screen in FIG. 13 shows a query based on purchase price.) These monthly payment amounts are estimates generated by the payment module 13 in response to data contained in the query statement formulated by the terminal processor 10*a*. An exact payment amount will be determined by the salesperson after he rejoins the customer. This screen displays a detailed list of features specific to the displayed vehicle. Highly desirable features may be highlighted with an asterisk, the use of a bold font or by some other suitable method. Drawing on the linked salesperson concept, this screen also prompts the customer to "Please ask your sales consultant for a test drive." 164 The system displays the name of the linked salesperson who logged the customer into the system initially. Thus, the customer's relationship with the salesperson is reinforced. The selected vehicle screen also gives the customer the option of printing a hard copy of the screen display. Logic steps for this screen are illustrated in Table 10 below.

TABLE 10

SELECTED VEHICLE SCREEN

● Display selected vehicle screen
● Play audio instructions.
● If return to last screen button pressed, then jump back one screen.
● If return to main menu button pressed, then go back to main menu.
● If sales consultant help selected, then go to final decision screen.
● If print selected, then print vehicle data/image. Upon completion of the print operation, the screen remains unchanged until the user selects one of the other options.
● Audio confirms each customer selection.

When the "Sales Consultant Help Key" 100 is selected from this screen, the final decision screen 140 is displayed. (See FIG. 14) The final decision screen permits the customer to either test drive the vehicle selected 142, obtain help from a sales consultant 100, return to the main menu 110, return to the selection screen, or obtain additional leasing information 146. If return to selection screen 144 is selected, the customer is taken back to the vehicle selection screen where the selected inventory is again displayed. Logic steps for the final decision screen are shown in Table 11 below.

TABLE 11

FINAL DECISION SCREEN

● Display final decision screen
● Play audio instructions.
● If return to main menu selected, go back to main menu.
● If sales person help selected, contact linked salesperson with customer help message.
● If test drive button selected, contact linked salesperson with test drive message.
● If return to selection screen selected, go back to vehicle selection screen to display selected inventory.
● If additional leasing information selected, contact salesperson with additional leasing message.
● Audio confirms each customer selection.

A novel feature of the system of the present invention is the contact established with the linked salesperson in response to the selection of keys 100–146. Terminal processor 10*a* initiates a command to communications device 15 via server 11 to contact the same salesperson 16 that logged the customer into the system at 40 in FIG. 4. The identity of that linked salesperson is maintained in memory in the terminal processor 10*a* and recalled for this step. This communication to the linked salesperson 16 may be accomplished in a number of ways. A preferred method is the use of a silent paging system. These systems are readily adaptable for use with computer systems and eliminate the use of noisy, ineffective overhead paging systems. A suitable system is marketed by Inter Page under the brand name ConneXions. This system will transmit numeric and alphanumeric messages to sales staff within a radius of up to one mile. The system features an interface with IBM compatible computers using Windows® paging software and the dealership's in-house telephone system. The ConneXions system's capability to send up to 50 preprogrammed messages permits a wide variety of customer help situations to be addressed.

If the "Sales Consultant Help" 100 key is selected, the linked salesperson is notified that the customer needs help to operate the system. If the "Test Drive" 142 key is selected the linked salesperson receives a different message indicating that the customer wants to test drive a vehicle. A different message is sent to the linked salesperson if the "Additional Leasing Information" key 146 is selected. In each instance, the linked salesperson has very specific information about the customers desires when he returns to the kiosk. The practice of the present invention includes providing other linked salesperson messages as appropriate for a variety of sales situations.

If no input is received from the customer in response to the final decision screen 140 after a specified time out period, the customer is automatically logged off 200 the system. (FIG. 4)

An additional feature of the present invention is the provision of a management monitoring feature. As shown in FIG. 1, management monitor 800 is tied in to server 11 to allow management personnel to track salesperson performance. For example, the monitor 800 could track each command to the communications device 16 to contact a linked salesperson 18 so that management could ensure that each customer request for help is answered. Alternatively, the communications device 16 could contact a member of management in addition to contacting the linked salesperson in response to a customer request.

The system of the present invention offers many advantages over the traditional methods for automobile transactions. First, the customer receives audio instruction for each step of the process and an audio confirmation of each selection made. This guidance makes the system "user-friendly" for those who may be put off by computer-assisted transaction systems.

Another advantage lies in the fact that the customer will always see some amount of current inventory no matter what her query contains. Accordingly, the customer is less likely to feel that the dealership does not have any vehicles that meet her needs. The positive feelings thus engendered will promote sales and repeat business The dealership benefits from monitoring queries that find no matches or that fail to find a minimum number of matches as a feedback source for maintaining inventory. If a specific type of vehicle is frequently requested but not available, the dealership can adjust its wholesale purchases accordingly.

Still another advantage of the system of the present invention stems from the ability to access the customer data and query results as the salesperson 18 and the customer close the transaction. To understand the advantages of the present invention, a typical automobile purchase must be described. In a typical prior art transaction, the customer and a non-linked salesperson gather in a small office where the salesperson completes paper contract forms by hand. Information concerning the selected vehicle is also hand entered, often with the assistance of notes scribbled by the salesperson on scraps of paper. The customer may have to wait while the salesperson walks out to the desired vehicle to collect information such as stock number or VIN information to complete this paperwork. This tedious process entails long waits while this paperwork is completed.

In the practice of the present invention, the salesperson would access the customer data and query results maintained in storage device 12 using an interface to a commercially available financing and insurance ("F&I") application 500. These applications are well known in the automobile industry and readily available from many sources. A suitable application is the Computerized Automotive Technologies system 5V. The F&I package extracts customer data (name, address, phone number), selected inventory data (stock number, price, VIN, etc.), and selected query elements (monthly payment amount) via server 11 to complete contract forms and to determine exact monthly payment amounts reflective of any down payment and the customer's credit history. (As described earlier, the payment module 15 provides only an estimated payment amount.) Thus, the salesperson 18 has immediate access and the ability to display complete information concerning the selected vehicle and the customer. Moreover, all required forms may be computer generated after asking the customer to verify that the data provided at registration is correct.

It should be understood that the present invention has been described with a full set of features for a preferred embodiment. However, the invention may be practiced successfully without using each of those features. By way of non-limiting example, the audio instruction/confirmation or minimum inventory features could be deleted depending on the desires and needs of a particular dealership. Moreover, the invention could be practiced successfully without the interface to the check-in system, the F&I application and the management monitor. One of the advantages of the present invention is the ability to tailor the features to a particular dealership.

Although the present invention has been described with preferred embodiments, it is to be understood that modifications and variations may be utilized without departure from the spirit and scope of this invention, as those skilled in the art will readily understand. Such modifications and variations are considered to be within the purview and scope of the appended claims and their equivalents.

The steps of the method disclosed for the present invention can be implemented by a computer programmer of ordinary skill in the art. A preferred embodiment of such an implementation is included herewith as Appendix A.

What is claimed is:

1. An on-site system for facilitating an automobile transaction for a customer comprising:

a) an input/display terminal adapted to form a multilevel customer query and to display responses thereto, the terminal including a terminal processor, wherein the terminal processor is adapted to create a link between the customer and a salesperson assigned to that customer;

b) a data server adapted to route a customer query from the input/display terminal to a storage device containing customer data, automobile inventory data, vehicle images, and video files, wherein the storage device is adapted to communicate to the input/display device via the data server a selected inventory responsive to the customer query;

c) a communications device for making a customer-initiated contact with the linked sales person from the input/display terminal via the data server.

2. The system of claim 1 further comprising a printer for printing information relating to at least one automobile from the selected inventory.

3. The system of claim 1 further comprising an interface between the storage device and an automobile check-in system wherein the interface updates the inventory data to include data relating to newly acquired automobiles as the newly acquired automobiles are received.

4. The system of claim 1 wherein the selected inventory is comprised of a minimum number of vehicles from the current automobile inventory.

5. The system of claim 1 further comprising an interface between the storage device and a financing and insurance application,
wherein the financing and insurance application is adapted to extract customer data and selected inventory information to determine exact monthly payments for the lease/purchase of an automobile from the selected inventory.

6. A method for facilitating an automobile purchase transaction between a customer and an automobile dealership comprising:
a) assigning a linked sales person to the customer;
b) providing a customer transaction kiosk including a display/input terminal and a terminal processor;
c) providing a storage device containing customer data, vehicle data, vehicle images, instructional audio, video, and a payment module;
d) creating a customer query containing parameters relating to a preferred automobile in the kiosk processor;
e) displaying a selected inventory at the input/display device; and
f) contacting the linked salesperson responsive to a customer-initiated request from the input/display device.

7. The method of claim 6 further comprising storing the customer query and associated selected inventory in the storage device.

8. A method for facilitating an automobile purchase transaction between a customer and an automobile dealership comprising:
a) providing a customer input/display terminal, the terminal including a terminal processor;
b) providing a storage device in communication with the input/display device via a data server, the storage device containing customer data, vehicle data, vehicle images, video files, audio files and a payment module;
c) generating a primary multilevel customer query in the input/display terminal processor;
d) displaying a selected inventory if the primary query returns a minimum number of vehicles from the current inventory;
e) generating a secondary query for comparative vehicles having similar characteristics to those meeting the primary query without further customer input in the input/display terminal processor if the primary query fails to return a minimum number of vehicles;
f) displaying a selected inventory comprised of vehicles meeting the secondary query if the number of vehicles from the secondary query equals a minimum number of vehicles;
g) repeating steps e) and f) until the number of vehicles from the primary and the secondary query equals a minimum number of vehicles to be displayed.

9. The method of claim 8 wherein the vehicle data is selected from the group consisting of model year, make, model, body style, color, stock number, VIN number, transmission type, engine type, location, mileage, price and vehicle features.

10. The method of claim 8 wherein the vehicle images are keyed to the corresponding vehicle by a selected item of vehicle data.

11. The method of claim 10, wherein the selected item of vehicle data is the VIN number.

12. The method of claim 8 further comprising storing the primary and secondary queries and associated selected inventories for each customer in the storage device.

13. The method of claim 8 further comprising accessing the customer data and the selected inventory via the data server from a financing and insurance application to determine exact monthly payments for the lease/purchase of an automobile from the selected inventory.

14. The method of claim 8 wherein the secondary query is generated by deleting a query level from the primary query.

15. The method of claim 8 wherein the secondary query is generated by modifying at least one of the primary query levels.

16. A method for facilitating an automobile purchase transaction between a customer and an automobile dealership comprising:
a) providing a customer transaction kiosk including an input/display terminal and a terminal processor;
b) providing a data server adapted to route a customer query from the input/display terminal to a storage device containing customer data, vehicle data, vehicle images, video;
c) creating in the terminal processor a customer query containing parameters relating to a preferred automobile in the kiosk processor;
d) executing the customer query to identify a selected inventory wherein the selected inventory comprises a predetermined minimum number of selected items from the current inventory database and sufficient additional items outside the customer parameters to meet the minimum number if fewer than the minimum number exist in the inventory; and
e) displaying the selected inventory at the input/display device.

17. The method of claim 16 further comprising:
a) displaying a list of available salespersons on the input/display device; and
b) contacting a customer-selected sales person from the list via a communications device.

18. The method of claim 16 further comprising:
a) displaying a group of images of available sales persons; and
b) contacting a customer-selected sales person from the group via a communications device.

19. A method for facilitating an automobile purchase transaction between a customer and an automobile dealership comprising:
a) providing a customer input/display device;
b) providing a storage device in communication with the input/display device via a data server, the storage device containing customer data, vehicle data, vehicle images, video files, and audio files;
c) generating a multilevel customer query in the input/display device;
d) playing an audio instruction before each level of the primary query is generated by the customer and playing an audio confirmation after each level is generated; and e) displaying a selected inventory.

20. A method for facilitating an automobile purchase transaction between a customer and an automobile dealership comprising:

a) providing a customer transaction kiosk including an input/display terminal and a terminal processor;

b) providing a data server adapted to route a customer query from the input/display terminal to a storage device containing customer data, vehicle data, vehicle images, and video;

c) creating a customer query containing parameters relating to a preferred automobile in the kiosk processor;

d) displaying a selected inventory at the input/display device;

e) storing the customer query and selected inventory; and f) accessing the customer data, customer query and the selected inventory via the data server from a financing and insurance application to determine exact monthly payments for the lease/purchase of an automobile from the selected inventory.

21. A method for facilitating an automobile purchase transaction between a customer and an automobile dealership comprising:

a) assigning a linked sales person to the customer;

b) providing a customer transaction terminal including a input/display terminal and a terminal processor;

c) providing a storage device containing customer data, vehicle data, vehicle images, instructional audio, video and a payment module;

d) creating a multilevel customer query containing parameters relating to a preferred automobile in the terminal processor;

e) executing the customer query to identify a selected inventory comprised of a predetermined minimum number of selected items from the current inventory database and sufficient additional items outside the customer parameters to meet the minimum number if fewer than the minimum number exist in the inventory;

f) displaying the selected inventory at the input/display device;

g) contacting the linked salesperson responsive to a customer-initiated request from the input/display terminal; and h) storing the customer query and selected inventory in the storage device.

22. A system for facilitating an automobile transaction for a customer comprising:

a) an input/display terminal adapted to form a customer query, the terminal including a terminal processor, wherein the terminal processor is adapted to create a link between the customer and a salesperson assigned to that customer;

b) a data server adapted to route the customer query from the input/display terminal to a storage device, wherein the storage device is adapted to communicate to the input/display terminal via the data server a selected inventory responsive to the customer query; and c) a communications device connected to the data server for making a customer-initiated contact with the sales person using the link between the customer and the sales person.

23. The system of claim 22 wherein the storage device contains customer data, automobile inventory data, vehicle images, audio files and video files.

24. The system of claim 22 wherein the storage device contains automobile inventory data, vehicle images, audio files and video files and wherein the terminal processor further comprises a storage device containing customer data and video files.

25. A system for facilitating an automobile transaction for a customer comprising:

a) an input/display device adapted to form a customer query containing parameters relating to a preferred automobile;

b) a storage device containing automobile inventory data; and c) a data server adapted to route a customer query from the input/display device to the storage device, to execute the customer query so as to create a selected inventory by determining whether a predetermined minimum number of automobiles from the inventory data meet the parameters and adding additional automobiles outside the parameters if fewer than the minimum number exist in the inventory data, and to communicate to the input/display device the selected inventory.

26. A system for facilitating an automobile purchase transaction between a customer and an automobile dealership comprising:

a) a customer transaction kiosk including an input/display terminal and a terminal processor;

b) a storage device containing customer data, current inventory data, vehicle images, audio files and video files; and c) a data server adapted to route a customer query from the input/display terminal to the storage device; to create a customer query containing parameters relating to a preferred automobile in the kiosk processor; to execute the customer query and create a selected inventory by determining whether a predetermined minimum number of inventory items meet the parameters and adding at least one additional item outside the parameters if fewer than the minimum number exist in the inventory; and to display the selected inventory at the input/display terminal.

27. A system for facilitating an automobile purchase transaction between a customer and an automobile dealership comprising:

a) a customer input/display device;

b) a storage device in communication with the input/display device, the storage device containing customer data, vehicle data, vehicle images, video files, and audio files;

c) a data server in communication with the input/display device and the storage device for generating a multilevel customer query in the input/display device, playing an audio instruction before each level of the query is generated by the customer, playing an audio confirmation after each level is generated; and displaying a selected inventory.

28. The system of claim 27 wherein the customer data and the video files are stored in a storage device contained in the input/display device.

29. A system for facilitating an automobile purchase transaction between a customer and an automobile dealership comprising:

a) a customer transaction kiosk including an input/display terminal and a terminal processor;

b) a storage device containing customer data, vehicle data, vehicle images, and video;

c) a data server adapted for creating a customer query containing parameters relating to a preferred automobile; routing the customer query to the storage device; displaying a selected inventory at the input/display device; storing the customer query and selected inventory; and d) an interface between the data server and a financing and insurance application for determining exact monthly payments for the lease/purchase of an automobile from the selected inventory using the stored customer query and selected inventory information.

30. A system for facilitating an automobile transaction for a customer comprising:

a) an input/display terminal adapted to form a multilevel customer query and to display responses thereto, the terminal including a terminal processor, wherein the terminal processor is adapted to create a link between the customer and a salesperson assigned to that customer;

b) a storage device containing inventory data;

c) a data server adapted to route a customer query from the input/display terminal to the storage device, and to communicate to the input/display device a selected inventory responsive to the customer query, wherein the selected inventory is comprised of a minimum number of vehicles from the current automobile inventory;

d) an interface between the storage device and an automobile check-in system for updating the inventory data to include data relating to newly acquired automobiles as the newly acquired automobiles are received;

e) an interface between the storage device and a financing and insurance application, wherein the financing and insurance application is adapted to extract customer data and selected inventory information from the storage device to determine exact monthly payments for the lease/purchase of an automobile from the selected inventory;

f) a communications device connected to the data server for making a customer-initiated contact with the sales person using the link between the customer and the sales person.

31. The system of claim 30 further comprising a printer for printing information relating to at least one automobile from the selected inventory.

32. The system of claim 30 wherein the selected inventory comprises a minimum number of selected automobiles from the automobile inventory to include additional automobiles outside customer parameters if fewer than the minimum number of automobiles meeting customer parameters exist in the inventory.

* * * * *